United States Patent
Wang et al.

(10) Patent No.: US 11,592,580 B2
(45) Date of Patent: Feb. 28, 2023

(54) MULTI-FREQUENCY REAL-TIME KINEMATIC (RTK) MEASUREMENTS FOR GLOBAL NAVIGATION SATELLITE SYSTEM (GNSS) RECEIVERS

(71) Applicant: QUALCOMM Incorporated, San Diego, CA (US)

(72) Inventors: Min Wang, Tustin, CA (US); Ning Luo, Cupertino, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 16/998,892

(22) Filed: Aug. 20, 2020

(65) Prior Publication Data

US 2022/0057531 A1    Feb. 24, 2022

(51) Int. Cl.
*G01S 19/44* (2010.01)
*G01S 19/07* (2010.01)
*G01S 19/32* (2010.01)

(52) U.S. Cl.
CPC ............ *G01S 19/44* (2013.01); *G01S 19/072* (2019.08); *G01S 19/32* (2013.01)

(58) Field of Classification Search
CPC ........... G01S 19/44; G01S 19/72; G01S 19/32
USPC ....................... 342/357.27, 357.31
See application file for complete search history.

(56) References Cited

U.S. PATENT DOCUMENTS

2008/0122688 A1* 5/2008 Hatch ................ G01S 19/44
342/357.31

OTHER PUBLICATIONS

Database Compendex [Online] Engineering Information, Inc., New York, NY, US, 2015, Li T., et al., "Enhanced RTK Integer Ambiguity Resolution with Beidou Triple-Frequency Observations", XP002804678, Database Accession No. E20154101355714 Abstract & Lecture Notes in Electrical Engineering—China Satellite Navigation Conference, CSNC 2015, Proceedings 2015 Springer Verlag Deu, vol. 342, 2015, pp. 227-238, DOI: 10.1007/978-3-662-46632-2_19.
International Search Report and Written Opinion—PCT/US2021/042638—ISA/EPO—dated Nov. 15, 2021.
Li B., et al., "ERTK: Extra-Wide-Lane RTK of Triple-Frequency GNSS Signals", Journal of Geodesy, Feb. 23, 2017, 18 pages, DOI 10.1007/S00190-017-1006-1, [retrieved on Feb. 23, 2017], Equations (1), (18), (36) Sections: 1 Introduction, 2 Multi-frequency GNSS DD Observation Model, 3 ERTK: Mathematical Models, 4 ERTK Improved by Adding NL Observations.

* cited by examiner

*Primary Examiner* — Bo Fan
(74) *Attorney, Agent, or Firm* — QUALCOMM Incorporated

(57) ABSTRACT

A Real-Time Kinematic (RTK) solution is provided to mobile devices having multi-constellation, multi-frequency (MCMF) functionality, in which a single base station may have a baseline much farther than traditional base station and where the high accuracy positioning is achieved in a relatively short period of time. To enable this, embodiments involve modeling of an ionosphere-free carrier phase corresponding to combinations of at least three signals received from one or more satellites. The modeling retains the integer nature of carrier phase ambiguities, thereby allowing for fast convergence in determining the integer ambiguity of the carrier phases.

26 Claims, 12 Drawing Sheets

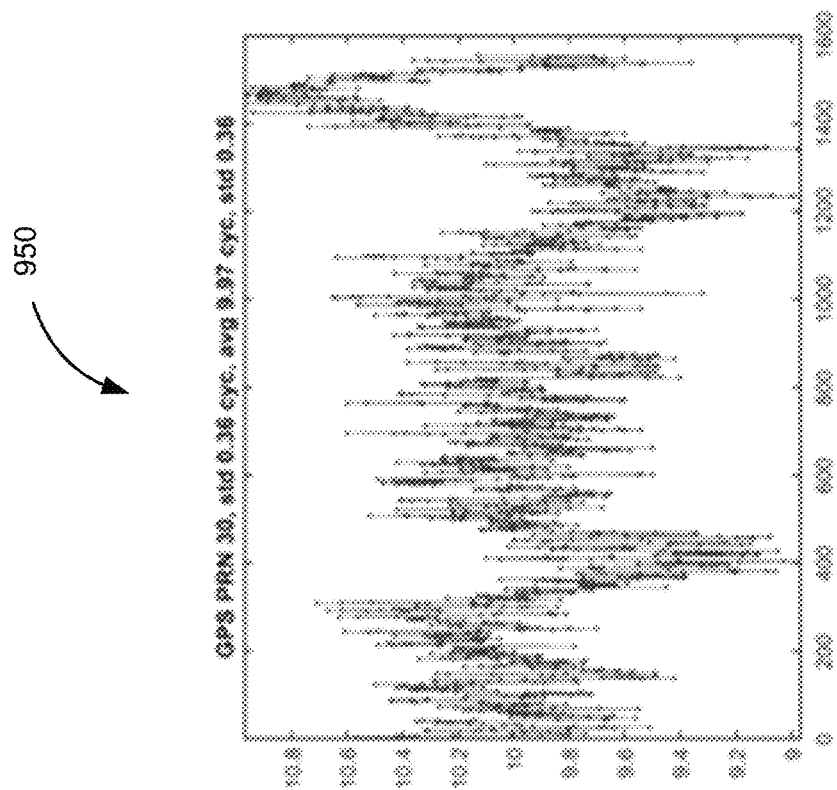
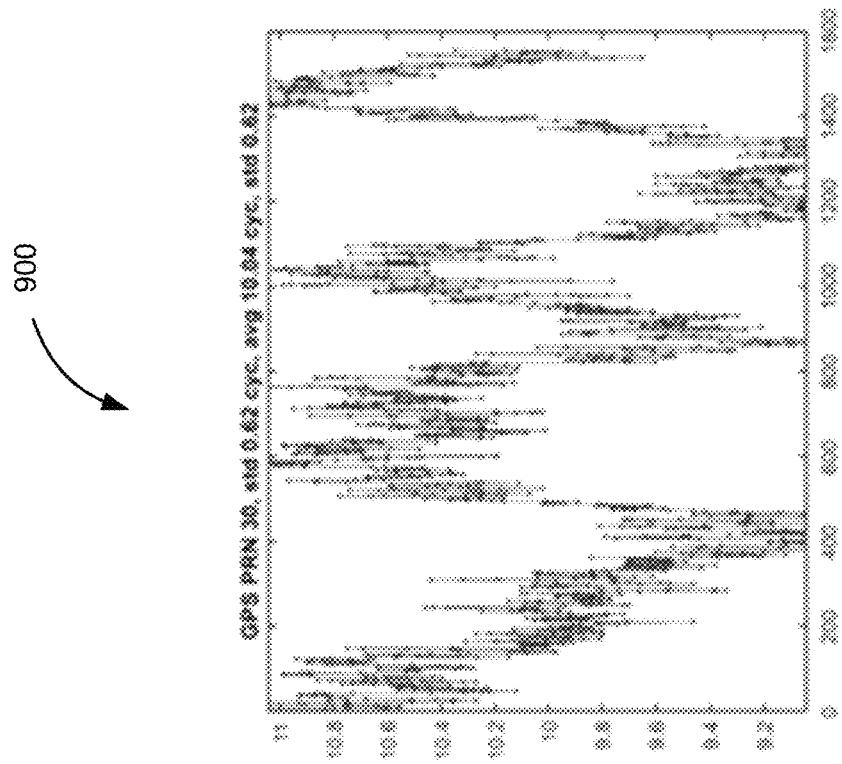
FIG. 9

```
┌─────────────────────────────────────────────────────────────────┐
│ Receive, from at least one satellite, a plurality of signals    │
│ comprising a first signal, a second signal, and a third signal, │
│ each one of the plurality of signals having a different         │
│ wavelength 1010                                                 │
└─────────────────────────────────────────────────────────────────┘
                                │
                                ▼
┌─────────────────────────────────────────────────────────────────┐
│ Determine, based on the plurality of signals, first Real-Time   │
│ Kinematic (RTK) measurement information 1012                    │
└─────────────────────────────────────────────────────────────────┘
                                │
                                ▼
┌─────────────────────────────────────────────────────────────────┐
│ Receive, from a base station, second RTK measurement            │
│ information 1014                                                │
└─────────────────────────────────────────────────────────────────┘
                                │
                                ▼
┌─────────────────────────────────────────────────────────────────┐
│ Determine a first phase for a first combination of the first    │
│ signal and the second signal, the first combination having a    │
│ wavelength that is longer than a first wavelength of the first  │
│ signal and a second wavelength of the second signal 1016        │
│  ┌───────────────────────────────────────────────────────────┐  │
│  │ Compute a first integer ambiguity based on a pseudo-range │  │
│  │ measurement, a phase measurement, and the wavelength      │  │
│  │ corresponding to the first combination 1017               │  │
│  └───────────────────────────────────────────────────────────┘  │
└─────────────────────────────────────────────────────────────────┘
                                │
                                ▼
┌─────────────────────────────────────────────────────────────────┐
│ Determine a second phase for a second combination of the second │
│ signal and the third signal, the second combination having a    │
│ wavelength that is longer than the second wavelength of the     │
│ second signal and a third wavelength of the third signal 1018   │
│  ┌───────────────────────────────────────────────────────────┐  │
│  │ Resolve a second integer ambiguity by applying an integer │  │
│  │ ambiguity resolution (IAR) process that uses a            │  │
│  │ pseudo-range measurement corresponding to the third       │  │
│  │ signal and the phase measurement corresponding to the     │  │
│  │ first combination 1019                                    │  │
│  └───────────────────────────────────────────────────────────┘  │
└─────────────────────────────────────────────────────────────────┘
                                │
                                ▼
┌─────────────────────────────────────────────────────────────────┐
│ Determine an ionosphere-free phase based on the first phase     │
│ and the second phase 1020                                       │
└─────────────────────────────────────────────────────────────────┘
                                │
                                ▼
┌─────────────────────────────────────────────────────────────────┐
│ Determine a location of the rover station based on the          │
│ ionosphere-free phase 1022                                      │
└─────────────────────────────────────────────────────────────────┘
```

FIG. 10

MULTI-FREQUENCY REAL-TIME KINEMATIC (RTK) MEASUREMENTS FOR GLOBAL NAVIGATION SATELLITE SYSTEM (GNSS) RECEIVERS

BACKGROUND

Aspects of the present disclosure relate to high accuracy positioning of a Global Navigation Satellite System (GNSS) receiver by using multi-frequency Real-Time Kinematic (RTK) measurements.

High-accuracy positioning can provide significant value to various modern-day applications for mobile devices. For example, not only is it helpful to have meter-level positioning to determine the lane of the road in which a vehicle is located for autonomous driving applications, it is further helpful to have sub-meter-level positioning to determine where, within the lane, the vehicle is located. Consumer-grade GNSS receivers now offer quality carrier phase measurements, with multi-constellation, multi-frequency (MCMF) functionality. When used with RTK correction, these receivers can provide this type of high-accuracy positioning.

BRIEF SUMMARY

Techniques described herein leverage MCMF functionality to provide a very-long baseline (VLB) RTK solution in which a single base station can cover a radius (or baseline) much farther than traditional methods (one thousand miles or more) and in which the high-accuracy positioning can be quickly determined. To enable this, embodiments involve modeling of an ionosphere-free carrier phase corresponding to combinations of at least three signals that are received from one or more satellites and that have different carrier phases. The modeling retains the integer nature of carrier phase ambiguities, thereby allowing for fast convergence in determining the integer ambiguity of the carrier phases.

An example method of GNSS positioning of a rover station, according to this description, comprises receiving, from at least one satellite, a plurality of signals comprising a first signal, a second signal, and a third signal, each one of the plurality of signals having a different wavelength. The method further comprises determining a first carrier phase for a first combination of the first signal and the second signal. The first combination has a wavelength that is longer than a first wavelength of the first signal and a second wavelength of the second signal. The method further comprises determining a second carrier phase for a second combination of the second signal and the third signal. Here also, the second combination has a wavelength that is longer than the second wavelength of the second signal and a third wavelength of the third signal. The method further comprises determining an ionosphere-free carrier phase based on the first carrier phase and the second carrier phase, and determining a location of the rover station based on the ionosphere-free carrier phase.

An example device for GNSS positioning of a rover station, according to this description, comprises a memory and one or more processing units communicatively coupled with the memory and configured to receive, from at least one satellite, a plurality of signals comprising a first signal, a second signal, and a third signal, each one of the plurality of signals having a different wavelength. The one or more processing units are further configured to determine a first carrier phase for a first combination of the first signal and the second signal. The first combination has a wavelength that is longer than a first wavelength of the first signal and a second wavelength of the second signal. The one or more processing units are further configured to determine a second carrier phase for a second combination of the second signal and the third signal. Here also, the second combination has a wavelength that is longer than the second wavelength of the second signal and a third wavelength of the third signal. The one or more processing units are further configured to determine an ionosphere-free carrier phase based on the first carrier phase and the second carrier phase, and determine a location of the rover station based on the ionosphere-free carrier phase.

Another example device for GNSS positioning of a rover station, according to this description, comprises means for receiving, from at least one satellite, a plurality of signals comprising a first signal, a second signal, and a third signal, each one of the plurality of signals having a different wavelength. The device further comprises means for determining a first carrier phase for a first combination of the first signal and the second signal. The first combination has a wavelength that is longer than a first wavelength of the first signal and a second wavelength of the second signal. The device further comprises means for determining a second carrier phase for a second combination of the second signal and the third signal. Here also, the second combination has a wavelength that is longer than the second wavelength of the second signal and a third wavelength of the third signal. The device further comprises means for determining an ionosphere-free carrier phase based on the first carrier phase and the second carrier phase, and means for determining a location of the rover station based on the ionosphere-free carrier phase.

An example non-transitory computer-readable medium, according to this description, has instructions stored there for GNSS positioning of a rover station. The instructions, when executed by one or more processing units, cause the one or more processing units to receive, from at least one satellite, a plurality of signals comprising a first signal, a second signal, and a third signal, each one of the plurality of signals having a different wavelength. The instructions, when executed by one or more processing units, further cause the one or more processing units to determine a first carrier phase for a first combination of the first signal and the second signal. The first combination has a wavelength that is longer than a first wavelength of the first signal and a second wavelength of the second signal. The instructions, when executed by one or more processing units, further cause the one or more processing units to determine a second carrier phase for a second combination of the second signal and the third signal. Here also, the second combination has a wavelength that is longer than the second wavelength of the second signal and a third wavelength of the third signal. The instructions, when executed by one or more processing units, further cause the one or more processing units to determine an ionosphere-free carrier phase based on the first carrier phase and the second carrier phase, and determine a location of the rover station based on the ionosphere-free carrier phase.

BRIEF DESCRIPTION OF THE DRAWINGS

FIG. 9 is a graph illustrating integer ambiguity results, according to an embodiment.

FIG. 10 is a flow diagram of a method of determining a location of a GNSS receiver based on an ionosphere-free carrier phase, according to an embodiment.

DETAILED DESCRIPTION

Figure 1:
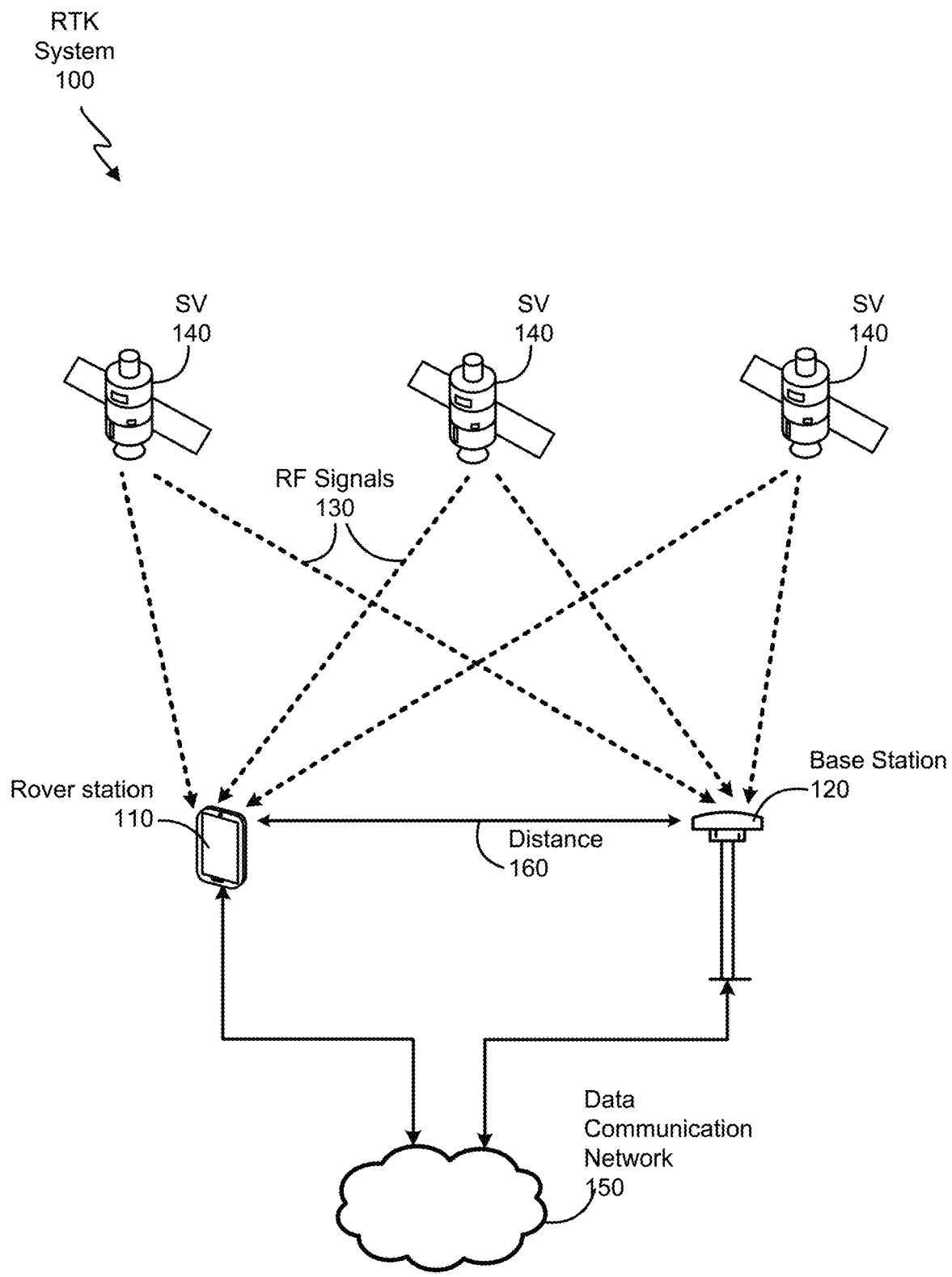
FIG. 1 is a simplified diagram of an RTK system, according to an embodiment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As noted, consumer-grade GNSS receivers now offer quality carrier phase measurements, with MCMF functionality capable of high-accuracy positioning. That said, current solutions for providing sub-meter accuracy have their shortcomings. Precise Point Positioning (PPP), for example, uses a network of global base stations to determine GNSS satellite orbit and clock corrections and transmit them to a "rover station" (e.g., a mobile device). But the network can be expensive to develop and maintain. Accordingly, PPP providers typically charge a fee for access to these corrections. Furthermore, PPP has several limitations, such as tight modeling of all errors (including ionospheric errors), which can require significant complexity, maintenance, and control and can require significant amount of processing time (e.g., ten to twenty minutes) before a high accuracy position can be determined. Furthermore, adding a new constellation to PPP can be slow and expensive because of its dependency on globally distributed reference network and data processing center for satellite orbit and clock determination. PPP performance significantly relies on the accuracy of the determined orbit and clock corrections, during events like satellite orbit eclipse, orbit correction accuracy will generally degrade which may cause issue for PPP performance.

RTK is an alternative to PPP. RTK corrections are a GNSS-based positioning technique that uses carrier-based ranging by determining the number of carrier cycles between a satellite and rover station (e.g., carrier phase measurements, including changes in phase and the number of cycles of the carrier signals). Various errors (e.g., satellite clock and orbit, ionospheric and tropospheric delays, phase wind-up, site displacement including solid earth tide, ocean loading, and pole tide) can be neglected if differencing observations with a "base station" (a station having a known location), assuming the observations have effectively the same errors. However, because differences in atmospheric errors between the base station and rover station—primarily tropospheric effects—increase with increased distance between the two, current ranges are limited. Thus, to provide RTK corrections for the whole United States would require a massive, expensive network of base stations. In addition, the accuracy of the positioning can be impacted by strong solar activities in which ionospheric errors decorrelate significantly in spatial and time domains and may no longer be neglected.

Very long baseline (VLB) RTK is an improvement to RTK. VLB RTK significantly reduces the needed density of the network of base stations, whereby a single base station can cover about one thousand miles or more. However, like in PPP, ionospheric errors are dominant in VLB RTK. And ionosphere-free modeling of carrier phases is used to remove or reduce the impact of the ionospheric errors. However, the ionosphere-free modeling can amplify carrier phase noises and multipath errors and necessitate, like in PPP, significant amount of processing time (e.g., ten to twenty minutes) before a high accuracy position can be determined.

Hence, the above solutions for high accuracy positioning can be grouped in two categories. A first category includes RTK and neglects ionosphere-free errors. However, this category necessitates a high density base station network and the robustness of the positioning can be impacted by solar activities. A second category includes PPP and VLB RTK and uses ionosphere-free modeling. However, this category can necessitate a significant amount of processing time (e.g., ten to twenty minutes) to converge to the expected high accuracy of the position determination. Hence, with this category, at an initial power on of a GNSS receiver or at any time carrier signals are blocked (e.g., lost, not received, etc.) and then received again, the high accuracy positioning may not be available during that time period (e.g., up to twenty minutes or so are needed to converge to the high accuracy).

Embodiments of the present disclosure provide the high accuracy positioning by using ionosphere-free modeling while also significantly reducing the amount of time needed to converge to the high accuracy of the positon determination. Particular embodiments are an enhancement to VLB RTK (e.g., e-VLB RTK, where "e" denotes "enhanced"), where it may be sufficient to use a sparse density base station network (e.g., where each base station covers one thousand miles or more) and achieve the expected high accuracy in a much faster manner (e.g., potentially in a twenty to thirty seconds range). Such embodiments render the VLB RTK a better solution than PPP and RTK.

In an example, e-VLB RTK uses multiple measurements, including pseudo-ranges and carrier phases (e.g., carrier phases each corresponding to a combination of carrier signals), for three or more carrier signals each having a different wavelength (or equivalently, a frequency). The carrier signals can, but need not, belong to a same constellation (for example, and not limited to, L1, L2, L5 carrier signals in the Global Positioning System (GPS) constellation, E1, E5A, E5B, E5A E5B AltBOC, and E6 in the Galileo (GAL) constellation (up to thirty combinations), or B1C, B11, B1I, B1I B1C AltBOC, B2A, B2B, B2A B2B AltBOC, and B3 in the BeiDou (BDS) constellation (up to one-hundred and five combinations)). The measurements are used to model an ionosphere-free carrier phase from which the high accuracy position can be determined. The modeling can use double-differenced observations (e.g., based on measurement received from a base station) to substantially limit phase noises and multipath errors. Further, the modeling retains the integer nature of the ambiguity of the carrier phases (e.g., the integer ambiguity representing the initial value for a phase lock and enabling the computation of a phase range from phase and cycle measurements), thereby allowing the application of an IAR process for fast convergence. These and other aspects of e-VLB RTK are further described herein in connection with the figures.

FIG. 1 is a simplified diagram of an RTK system 100, according to an embodiment. The RTK system 100 generates RTK measurements that can be processed according to e-VLB RTK techniques described herein for fast convergence to a high accuracy position. Put generally, the RTK system 100 enables a highly accurate GNSS position fix of the rover station 110 using GNSS receivers at both the rover station 110 and base station 120 that receive RF signals 130 from satellite vehicles (SVs) 140 from one or more GNSS constellations (e.g., GPS, GAL, BDS, etc.). In an example, a GNSS receiver also includes a transceiver. The types of rover stations 110 used may vary, depending on application. In some embodiments, for instance, the rover station 110 may comprise consumer electronics or devices, such as a mobile phone, tablet, laptop, wearable device, vehicle, or the like. In some embodiments, the rover station 110 may comprise industrial equipment, such as survey equipment. In yet other embodiments, the rover station 110 can be integrated with equipment to provide various location-based functionalities, such as being integrated in vehicles, including autonomous ground, aerial, and maritime vehicles.

It can be further noted that, although the embodiment illustrated in FIG. 1 and additional embodiments described herein show the use of only a single base station 120, alternative embodiments may employ more than one base station 120. That is, according to some embodiments, the rover station 110 may employ RTK correction information from a plurality of base stations 120, individually and/or collectively. As such, it will be understood that references to "a base station" in the description of the embodiments herein may refer to one base station of a plurality of base stations.

To perform a traditional GNSS position fix, the rover station 110 can use code-based positioning to determine a distance of each of the SVs 140 based on a determined delay in a generated pseudorandom binary sequence received in the RF signals 130, and the resulting accuracy of the position fix for the rover station 110 is subject to errors caused by SV 140 orbit and clock, ionosphere and troposphere delays, and other phenomena. Although this can provide accuracy on the order of meters, this accuracy may be insufficient for many applications.

As noted, traditional RTK can provide enhanced accuracy (e.g., on the order of centimeters or decimeters) by using carrier-based ranging based on the carrier phases of the RF signals 130 and using the base station 120 to help reduce errors from various error sources. A carrier phase is referred to herein as a phase in in the interest of brevity. The base station 120, comprises a fixed GNSS receiver that, using carrier-based ranging and known position, determines correction information to reduce the errors as described above (e.g., orbit and clock errors, ionosphere and troposphere delays, etc.), which can then be provided to the rover station 110 via, for example, a data communication network 150.

The RTK correction information is only valid, however, within a threshold distance 160. That is, the RTK correction information assumes similar errors (e.g., atmospheric errors) between base station 120 and rover station 110, based on the rover station 110 being within a threshold distance 160, or "baseline," from the base station 120. However, because spatial decorrelation in the errors increases over distance 160 (e.g., because RF signals 130 pass through different portions of the atmosphere when traveling to the base station 120 then to the rover station 110), this distance 160 is limited for traditional RTK. For traditional RTK systems having a single base station, this distance 160 is 10-20 km. For network RTK having multiple base stations (and thus multiple data points), this distance 160 can be extended to 40-50 km. Beyond this distance, the integer ambiguity of the carrier phase may not be resolvable for the rover station 110. And thus, the RTK correction information at such distances may have limited or no use in a position fix of the rover station 110.

Figure 2:
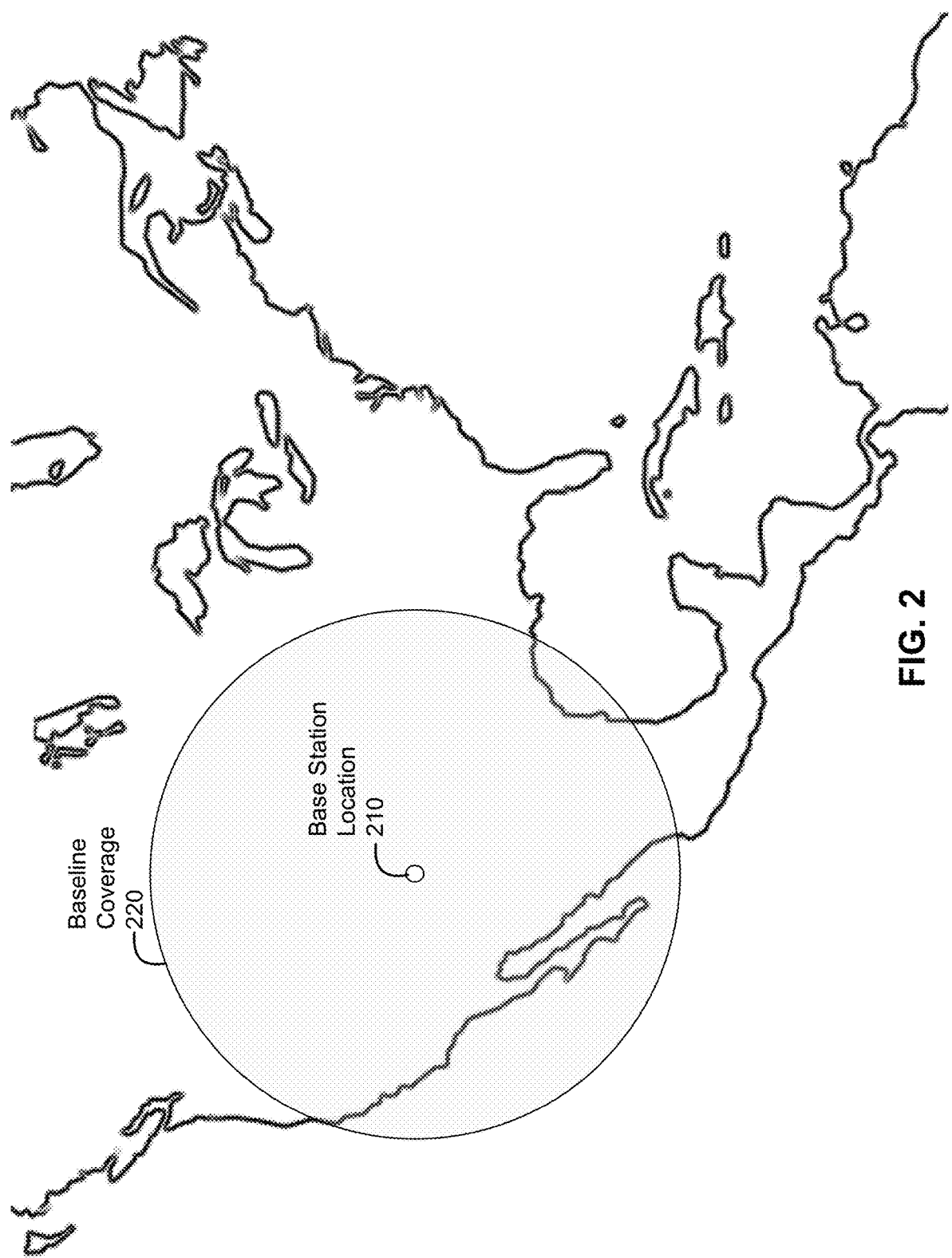
FIG. 2 is a map illustrating possible baseline coverage of a single base station, according to an embodiment.

According to embodiments provided herein, this distance 160 can be significantly extended for a given RTK system 100 (e.g., up to one thousand miles or more) by leveraging MCMF functionality of a GNSS receiver at the rover station 110 and using e-VLB RTK techniques for compensating for atmospheric differences between the rover station 110 and base station 120. As shown in FIG. 2, for example, a single base station 120 located at a base station location 210 could provide an area of baseline coverage 220 capable of providing accurate RTK correction information for rover stations located in a majority of the United States. A few base stations 120 then, could provide coverage for all of North America. As such, this could provide significant savings in establishing a network of base stations 120 to provide RTK correction information, versus a traditional network RTK approach.

Referring again to FIG. 1, to significantly extend distance 160, embodiments can provide error correction including for ionospheric errors. In particular, ionosphere errors can be reduced using the MCMF functionality of the GNSS receiver at the rover station 110. To do so, the MCMF GNSS receiver can receive RF signals 130 transmitted on at least three frequencies (e.g., GPS L1, L2, L5 frequencies, GAL E1, E6, and E5A frequencies, BDS B11, B3, and B2A frequencies, etc.), derive various RTK measurements for the RF signals 130 and utilize e-VLB RTK processing techniques, described herein, for fast convergence to high accuracy positioning.

In an example, triple frequencies (or, equivalently, triple wavelengths) corresponding to three RF signals 130 are used, and are listed in Table 1 below (where "$f_0$" is a base frequency as 10.23 Mhz). Table 1 is only one illustrative example. Other combinations are possible (e.g., up to thirty combinations in the GAL constellation and up to one-hundred and five in the BDS constellation).

TABLE 1

| GNSS Frequency Identifier | GPS | GAL | BDS |
| --- | --- | --- | --- |
| GNSS-L1 | L1 (154* $f_0$) | E1 (154* $f_0$) | B11 (152.6* $f_0$) |
| GNSS-L2 | L2 (120* $f_0$) | E6 (125* $f_0$) | B3 (124* $f_0$) |
| GNSS-L5 | L5 (115* $f_0$) | E5A (115* $f_0$) | B2A (115* $f_0$) |

The raw RTK measurements involve pseudo-range measurement "P," carrier phase measurement "Φ," geometry range "ρ," receiver clock "dT," Inter-Signal Time Biases "ISTB," satellite orbit error "dOrb", satellite clock error "dClk", troposphere delay "Trop," ionosphere delay residual error "dIono," ambiguity integer term "N," ambiguity receiver fractional bias term "r," ambiguity satellite fractional bias term "s," and noise and multipath error "ε." The MCMF GNSS receiver can generate the raw RTK measurements according to the following equations:

$$P_{L1} = \rho + dT + ISTB_{L1} + dOrb - dClk + Trop + \frac{dIono}{f_1^2} + \epsilon_{P_{L1}},$$

$$\Phi_{L1} = \rho + dT + ISTB_{L1} + dOrb -$$
$$dClk + Trop - \frac{dIono}{f_1^2} + \lambda_{L1}(N_{L1} + r_{L1} - s_{L1}) + \epsilon_{\Phi_{L1}},$$

$$P_{L2} = \rho + dT + ISTB_{L2} + dOrb - dClk + Trop + \frac{dIono}{f_2^2} + \epsilon_{P_{L2}},$$

$$\Phi_{L2} = \rho + dT + ISTB_{L2} + dOrb -$$
$$dClk + Trop - \frac{dIono}{f_2^2} + \lambda_{L1}(N_{L2} + r_{L2} - s_{L2}) + \epsilon_{\Phi_{L2}},$$

$$P_{L5} = \rho + dT + ISTB_{L3} + dOrb - dClk + Trop + \frac{dIono}{f_5^2} + \epsilon_{P_{L3}},$$

$$\Phi_{L5} = \rho + dT + ISTB_{L5} + dOrb -$$
$$dClk + Trop - \frac{dIono}{f_5^2} + \lambda_{L1}(N_{L5} + r_{L5} - s_{L5}) + \epsilon_{\Phi_{L5}}.$$

From the raw RTK measurements, the MCMF GNSS receiver (e.g., a position engine thereof) can implement the e-VLB RTK techniques. For example, the position engine uses a model that forms carrier phase combinations (e.g., carrier phases), defines an ionosphere-free carrier phase as a function of these combinations, resolves any integer ambiguity in the definition of the ionosphere-free carrier phase, and removes or reduces carrier phase noise and multipath errors in the computation of the ionosphere-free carrier phase.

Figure 3:
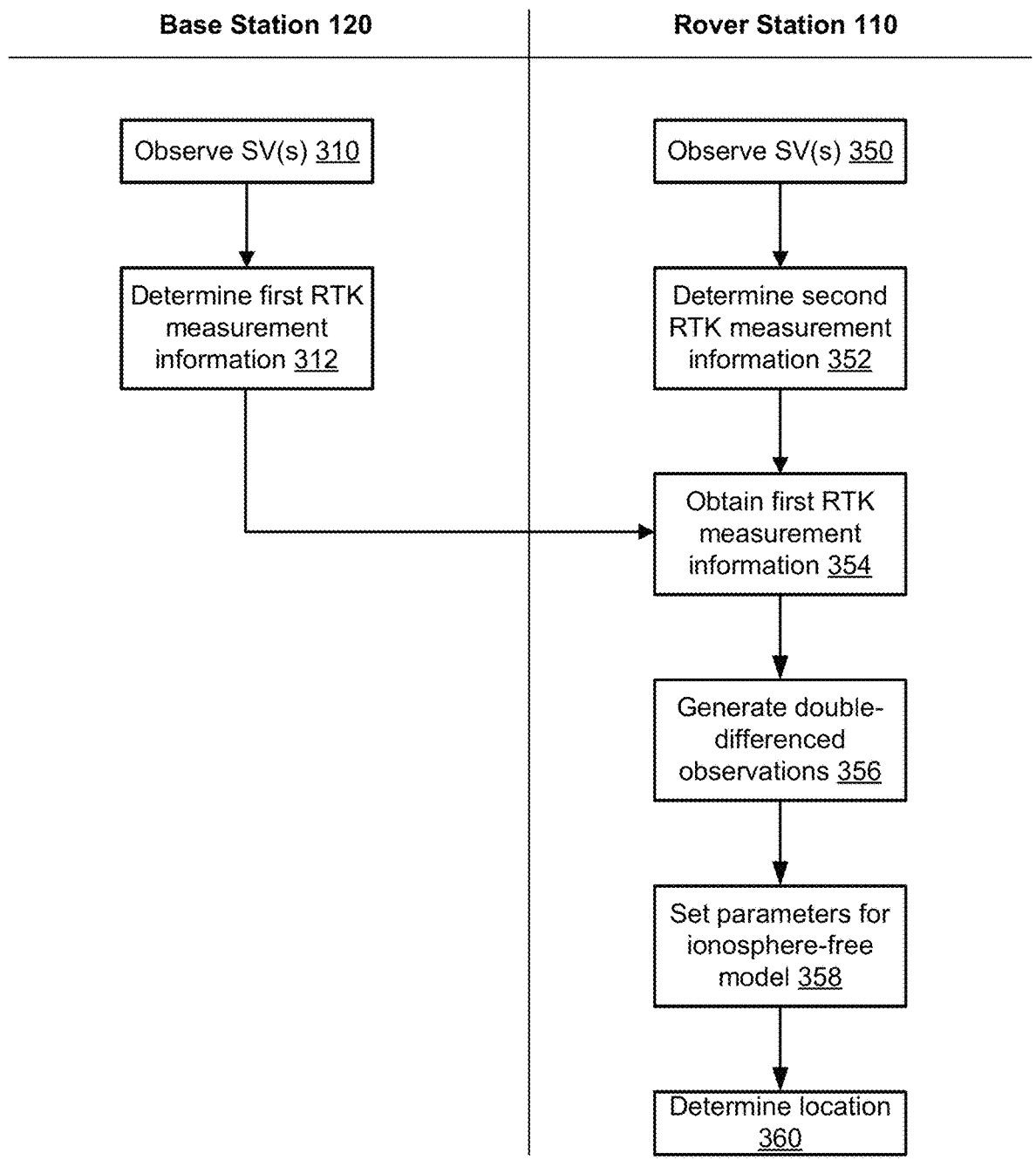
FIG. 3 is a swim-lane diagram of an embodiment of a method of enhanced GNSS location determination of a rover station in which multiple-frequency RTK measurements are used, according to an embodiment.

FIG. 3 is a swim-lane diagram of an embodiment of a method of enhanced GNSS location determination of a rover station 110 in which multiple-frequency RTK measurements are used, according to an embodiment. As with other figures provided herein, FIG. 3 is provided as a non-limiting example. As such, it will be understood that certain variations to the method illustrated may be made in alternative embodiments. Such variations may include performing the functionality described in the various blocks illustrated in FIG. 3 in a different order, adding and/or removing certain functions, and the like. Moreover, although various functions are ascribed to either the rover station 110 or a base station 120, it will be understood that some functions may be performed by one or more separate devices (e.g., computers) local to or remote from the base station 120 and/or rover station 110. In addition, although the position determination of the rover station 110 is illustrated as being performed by the rover station 110, this position determination can be performed by the base station 120 by reversing the described blocks applicable to the rover station 110 and the base station 120, or can be performed by another remote device by performing functions similar to the ones described for the rover station 110, and the determined position may be sent to the rover station 110 and/or another client device.

Starting with the base station 120, at block 310, the base station 120 observes one or more SVs 140. The base station 120 can include a MCMF GNSS receiver that receives at least three RF signals 130 transmitted by the one or more SVs 140. At block 312, the base station 120 determines first RTK measurement information. For instance, the MCMF GNSS receiver of the base station 120 performs carrier-based RTK range measurements using carrier waves of the at least three RF signals 130. These measurements involve pseudo-range measurements, carrier phase measurements, geometry ranges, receiver clocks, position error vectors, troposphere delays, ionosphere delay residual errors, ambiguity integer terms, ambiguity receiver fractional bias terms, ambiguity satellite fractional bias terms, and noise and multipath errors. The first RTK measurement information can be provided to the rover station 110. Because the distance 160 between the rover station 110 and the base station 120 may be significant (e.g., up to one thousand miles or so), the base station 120 may send this information to the rover station 110 via a data communication network 150 rather than via direct wireless means. As such, the data communication network 150 may comprise a Wide Area Network (WAN), which may include one or more public and/or private data communication networks (including the Internet), and may utilize any variety of wired and/or wireless communication technologies. In some embodiments, the RTK measurement information may be responsive to a request for such information (not shown in FIG. 3) sent from the rover station 110.

Now referring to the rover station, at block 350, the rover station 110 also observes the one or more SVs 140. The rover station 110 can include a MCMF GNSS receiver (including a transceiver in an example) that receives at least three RF signals 130 transmitted by the one or more SVs 140. At block 352, the rover station 110 determines second RTK measurement information. For instance, the MCMF GNSS receiver of the rover station 110 (e.g., a measurement engine (ME) of this receiver) performs carrier-based RTK range measurements using carrier waves of the at least three RF signals 130. These measurements involve pseudo-range measurements, carrier phase measurements, geometry ranges, receiver clocks, position error vectors, troposphere delays, ionosphere delay residual errors, ambiguity integer terms, ambiguity receiver fractional bias terms, ambiguity satellite fractional bias terms, and noise and multipath errors. At block 354, the rover station 110 receives the first RTK measurement information sent from the base station 120.

At block 356, the rover station 110 (e.g., a positioning engine (PE) of the MCMF GNSS receiver) generates double-differenced observations from the first RTK measurements and the second RTK measurements. Double-differenced observations are indicated by the "∇Δ" symbol in the equations described in connection with the next figures. Generally, a difference is determined by a receiver (e.g., of the rover station 110 or the base station 120) for two or more observed measurements for a parameter. A double-differenced observation is a difference of the difference, such as the difference, for the same parameter, between the difference of the observed measurements by one receiver (e.g., the rover station 110) and the difference of the observed measurement by the other receiver (e.g., the base station 120). To illustrate, a double-difference observation for a phase "$\nabla \Delta \phi_{L1-L2}$," is the difference "∇" between a first difference "Δ" measured by the receiver of the rover station 110 for the phase between two RF signals (e.g., $\Delta \phi_{L1-L2}$ for the L1 and L2 signals as measured at the rover station 110) and a second difference "Δ" measured by the receiver of the base station 120 for the phase (e.g., $\Delta \phi_{L1-L2}$ for the L1 and L2 signals as measured at the base station 120). Double-differenced observations allow the removal of the satellite clock error, the ambiguity receiver fractional bias term and ambiguity satellite fractional bias term, and the reduction of satellite orbit error to a neglectable level.

Further, at block 358, the rover station 110 (e.g., the PE) sets parameters for an ionosphere-free model. For instance, this model defines an ionosphere-free carrier phase from which a location (e.g., a high accuracy position) of the rover statin 110 can be derived. The ionosphere-free carrier phase can be defined as a function of carrier phases, each of which is a carrier phase that corresponds to a combination of two of three RF signals, as further illustrated in FIG. 4. The integer ambiguities of the carrier phases can be computed directly, as illustrated in FIG. 5, and/or resolved in a fast manner per an IAR process, as illustrated in FIGS. 6-7. The determination of the integer ambiguities and the ionosphere-free carrier phase can involve the double-differenced observations. At block 360, the rover station 110 (e.g., the PE) determines the location based on the ionosphere-free carrier phase. For instance, this phase does not suffer from ionospheric errors, thereby significantly increasing the accuracy of the location determination. As would be apparent to a person of ordinary skill in the art in light of the embodiments of the present disclosure, the ionosphere-free carrier phase is usable to determine, at a high accuracy, the number of carrier cycles between the MCMF GNSS receiver of the rover station 110 and the one or more SVs 140. The location is a function of the number of carrier cycles.

Figure 4:
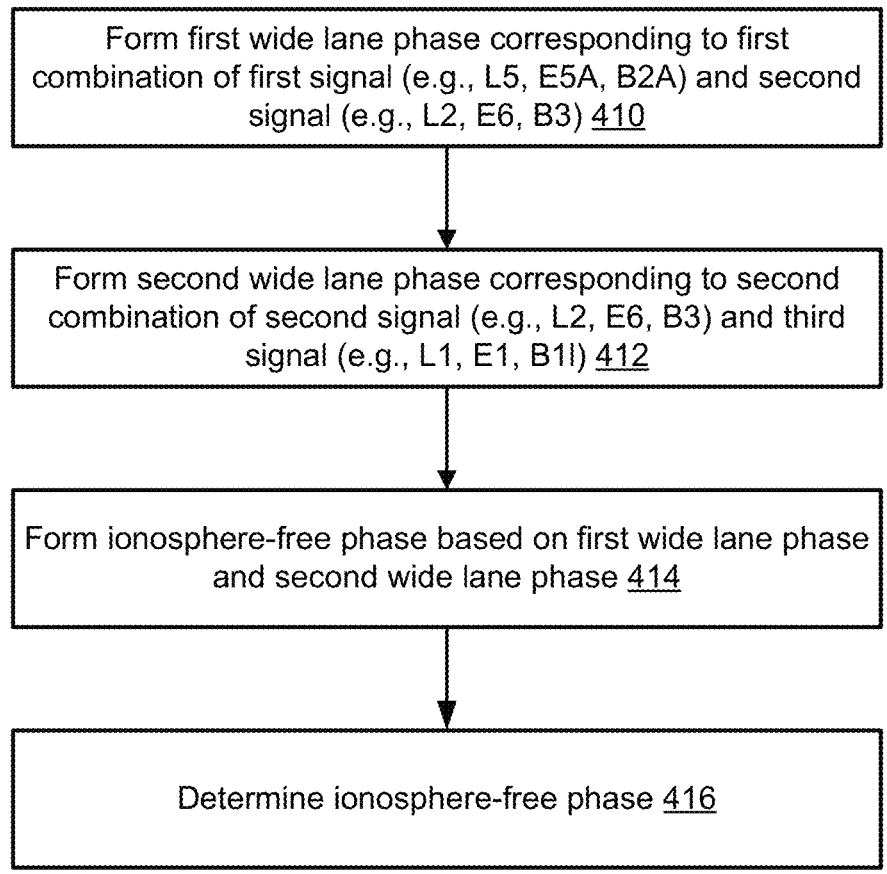
FIG. 4 is a flow diagram of a method of determining an ionosphere-free carrier phase based on RTK measurements, according to an embodiment.
Figure 5:
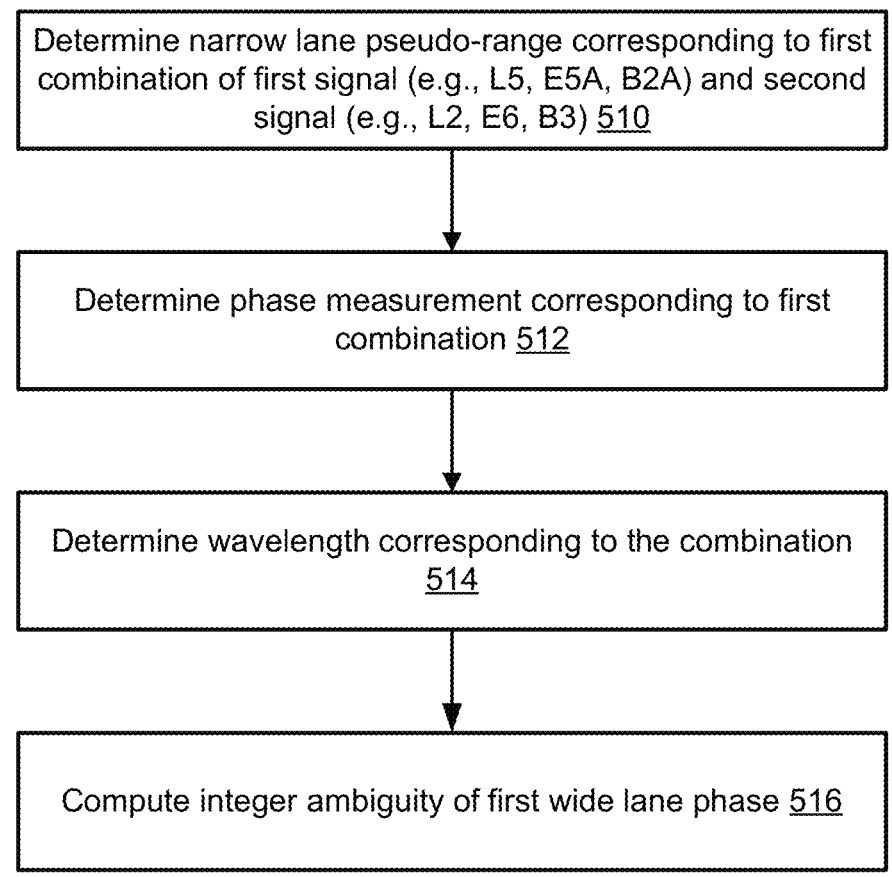
FIG. 5 is a flow diagram of a method of computing an integer ambiguity of a wide lane phase based on RTK measurements, according to an embodiment.
Figure 6:
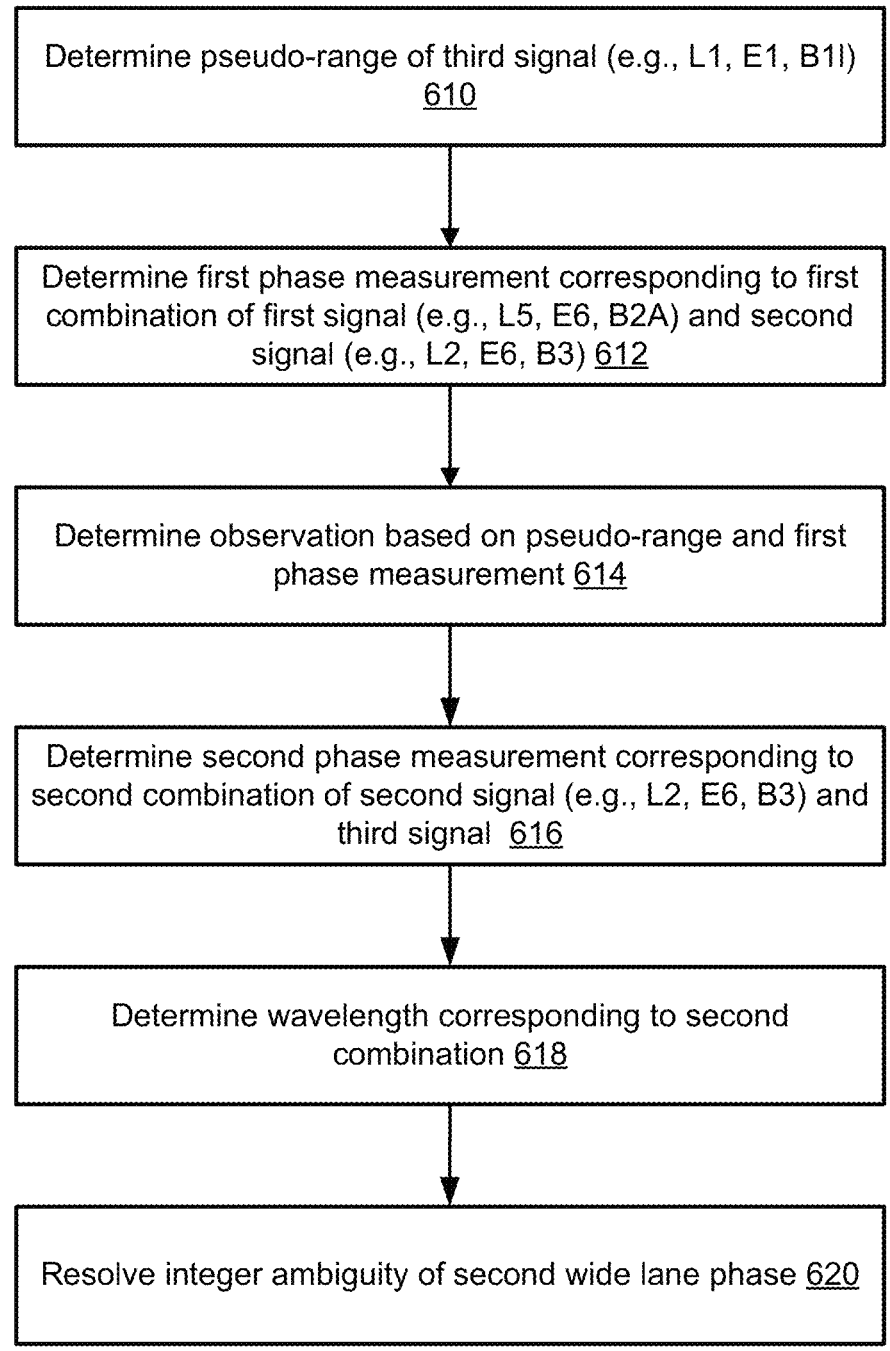
FIG. 6 is a flow diagram of a method of using an integer ambiguity resolution (IAR) process to determine an integer ambiguity of a wide lane phase based on RTK measurements, according to an embodiment.
Figure 7:
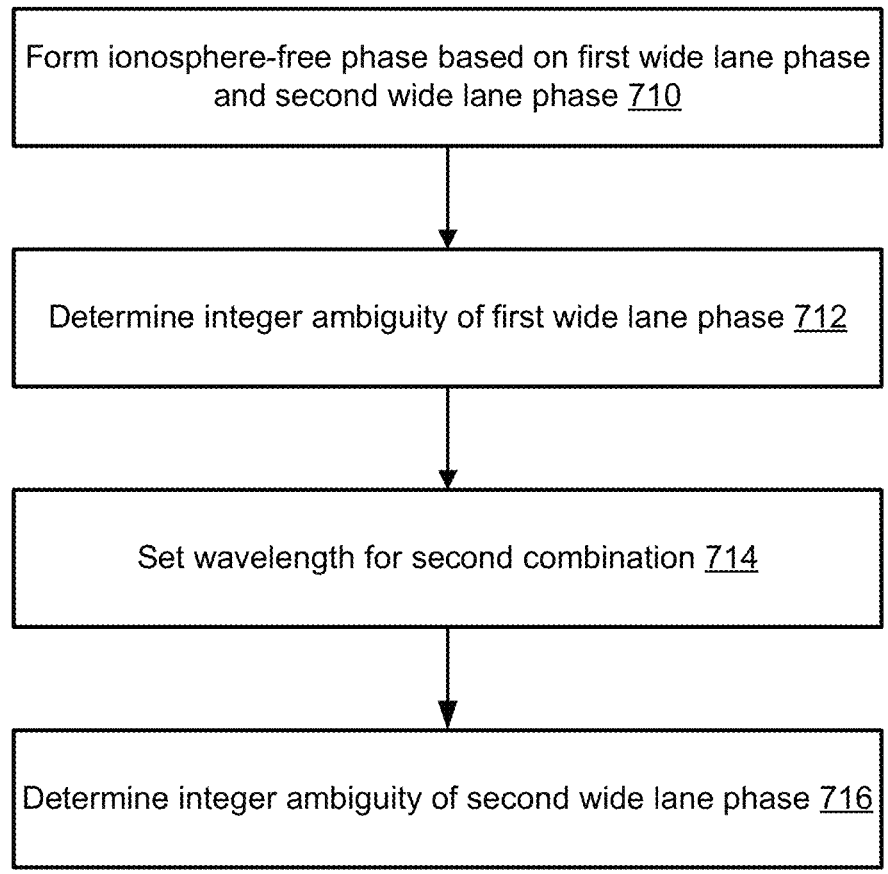
FIG. 7 is a flow diagram of another method of determining an integer ambiguity of a wide lane phase based on RTK measurements.

FIGS. 4-7 illustrate examples of flow diagrams associated with using an ionosphere-free model, in accordance with various embodiments. Some or all of instructions for performing the operations of the flow diagrams can be implemented as hardware circuitry and/or stored as computer-readable instructions on a non-transitory computer-readable medium of a GNSS receiver (e.g., one included in the rover station 110, the base station 120, or another device and that can also include a transceiver). As implemented, the instructions represent modules that include circuitry or code executable by a processor(s) of the GNSS receiver, as applicable. The use of such instructions configures the GNSS receiver to perform the specific operations described herein. Each circuitry or code in combination with the processor represents a means for performing a respective operation(s). one or more operations may be omitted, skipped, performed in parallel, and/or reordered FIG. 4 is a flow diagram of a method of determining an ionosphere-free carrier phase based on RTK measurements, according to an embodiment. At block 410, the GNSS receiver forms a first wide lane phase corresponding to a first combination of a first signal and a second signal. The first wide lane phase is an example of a carrier phase for the first combination. The first combination itself is a pseudo-signal as it is not an actually received signal but is a joint representation of the first signal and the second signal. The first combination has a wavelength that is in the range of two to six meters (depending on the constellation and the specific signal therefrom) and that is longer than the wavelength of the first signal and the wavelength of the second signal. By using a longer wavelength (and, thus, the nomenclature of "wide lane"), this carrier phase can increase the convergence time needed to compute the ionosphere-free carrier phase at high accuracy. In an example, the first signal corresponds to GNSS-L5 identified in Table 1 above (e.g., GPS L5, GAL E5A, BDS B2A, etc.). In this example, the second signal corresponds to GNSS-L2 also identified in Table 1 above (e.g., GPS L2, GAL E6, BDS B3, etc.). Accordingly, the first combination is the combination of the GNSS-L2 and GNSS-L5 signals and has a wavelength between about three meters to about five meters (depending on the constellation). The first wide lane phase can be noted as "$\Phi_{WL-2-5}$" to denote the use of the GNSS-L2 and GNSS-L5 signals.

At block 412, the GNSS receiver forms a second wide lane phase corresponding to a second combination of the second signal and a third signal. The second wide lane phase is also an example of a carrier phase, but this carrier phase corresponds to the second combination. Similar to the first combination, the second combination is a pseudo-signal having a wavelength that is in the range of a half meter to two meters (depending on the constellation and the specific signal therefrom) and that is longer than the wavelength of the second signal and the wavelength of the third signal. In an example, the third signal corresponds to GNSS-L1 identified in Table 1 above (e.g., GPS L1, GAL E1, BDS B11, etc.). In this example, the first combination is a joint representation of the GNSS-L1 and GNSS-L2 signals and has a wavelength of about a meter (depending on the constellation). The second wide lane phase can be noted as "$\Phi_{WL-1-2}$" to denote the use of the GNSS-L1 and GNSS-L2 signals.

At block 414, the GNSS receiver forms the ionosphere-free carrier phase based on the first wide lane phase and the second wide lane phase. Double-differenced observations are used in the definition of the ionosphere-free carrier phase and can remove the ambiguity receiver fractional bias terms and the ambiguity satellite fractional bias terms. Further, ambiguities are integer properties and, thus, IAR processes can be used. In an example, and referring back to "$\Phi_{WL-1-2}$" and "$\Phi_{WL-2-5}$", the ionosphere-free carrier phase is defined as "$\Phi_{IF,(WL-1-2,WL-2-5)}$" and is modeled as:

$$\nabla \Delta \Phi_{IF,(WL-1-2,WL-2-5)} =$$

$$\frac{f_1 f_2}{f_1 f_2 - f_2 f_5} \nabla \Delta \Phi_{WL-1-2} - \frac{f_2 f_5}{f_1 f_2 - f_2 f_5} \nabla \Delta \Phi_{WL-2-5} =$$

$$\nabla \Delta \rho + \nabla \Delta Trop + \frac{f_1 f_2}{f_1 f_2 - f_2 f_5} \lambda_{WL-1-2} \nabla \Delta N_{WL-1-2} -$$

$$\frac{f_2 f_5}{f_1 f_2 - f_2 f_5} \lambda_{WL-2-5} \nabla \Delta N_{WL-2-5} + \epsilon_{\nabla \Delta \Phi_{IF,(WL-1-2,WL-2-5)}}.$$

where "$f_i$" is the frequency of the GNSS-$L_i$ signal ("i" being 1, 2, or 5), "$\lambda$" corresponds to the wavelength of the first combination or the second combination as applicable, "N" is the integer ambiguity of the first wide lane phase or the second wide lane phase as applicable, "$\rho$" is the geometry range, "Trop" is the troposphere delay, and "$\epsilon$" is noise and multipath error.

Various combination of the signals are possible and can result in wide lane phases. For instance, in addition to the above example combinations, a combination of GNSS-L1 and GNSS-L5 is possible. The wavelengths of these combinations are identified in Table 2 below. Each of the resulting wide lane phases can be expressed as:

$$\Phi_{WL-1-2} = \frac{f_1}{f_1 - f_2} \Phi_{L1} - \frac{f_2}{f_1 - f_2} \Phi_{L2} = \rho + dT + ISTB_{WL-1-2} +$$

$$Trop + \frac{dIono}{f_1 f_2} + \lambda_{WL-1-2}(N_{WL-1-2} + r_{WL-1-2} - s_{WL-1-2}) + \epsilon_{\Phi_{WL-1-2}},$$

$$\Phi_{WL-1-5} = \rho + dT + ISTB_{WL-1-5} + Trop + \frac{dIono}{f_1 f_5} +$$

-continued $$\Phi_{WL-2-5} = \rho + dT + ISTB_{WL-2-5} + Trop + \frac{dIono}{f_2\,f_5} + \lambda_{WL-1-5}(N_{WL-1-5} + r_{WL-1-5} - s_{WL-1-5}) + \epsilon_{\Phi_{WL-1-5}},$$
$$\lambda_{WL-2-5}(N_{WL-2-5} + r_{WL-2-5} - s_{WL-2-5}) + \epsilon_{\Phi_{WL-2-5}}.$$

TABLE 2

| GNSS Wide Lane (WL) | GPS WL | λ (m) | GAL WL | λ (m) | BDS WL | λ (m) |
|---|---|---|---|---|---|---|
| GNSS-L1/ GNSS-L2 | L1/L2 | 0.8619 | E1/E6 | 1.0105 | B1I/B3 | 1.0247 |
| GNSS-L1/ GNSS-L5 | L1/L5 | 0.7514 | E1/E5A | 0.7514 | B1I/B2A | 0.7794 |
| GNSS-L2/ GNSS-L5 | L2/L5 | 5.8610 | E6/E5A | 2.9305 | B3/B2A | 3.2561 |

As shown in Table 2, the combinations of GNSS-L1 and GNSS-L2 and GNSS-L2 and GNSS-L5 have longer wavelengths than that of the combination of GNSS-L1 and GNSS-L5. The longer wavelengths is one factor in the selection of the two former combinations. Another factor relates to the noise scale. In particular, and continuing with the three possible combinations, three ionosphere-free carrier phases can be defined: IF(WL-1-2,WL-1-5), IF(WL-1-2,WL-2-5), and IF(WL-1-5,WL-2-5). The noise scale of these three ionosphere-free carrier phases are identified in Table 3 below. Each of the three ionosphere-free carrier phases can be expressed as:

TABLE 3

| GNSS IF-WL ID | GPS | GAL | BDS |
|---|---|---|---|
| IF(WL-1-2,WL-1-5) | 178.43 | 102.57 | 114.84 |
| IF(WL-1-2,WL-2-5) | 100.60 | 56.90 | 63.88 |
| IF(WL-1-5,WL-2-5) | 119.42 | 77.74 | 85.86 |

As shown in Table 3, the ionosphere-free carrier phase using the first combination of GNSS-L1 and GNSS-L2 and the second combination of GNSS-L2 and GNSS-L5 (i.e., IF(WL-1-2,WL-2-5)) have the smallest noise scale (while these two combinations have the longest wavelengths). Accordingly, these two combinations are used in the modeling of the ionosphere-free carrier phase, where the modeling uses double-difference observations.

At block 416, the GNSS receiver determines the ionosphere-free carrier phase (e.g., IF(WL-1-2,WL-2-5)). For example, the double differenced ionosphere-free carrier phase "$\nabla\Delta_{\Phi_{IF,(WL-1-2,WL-2-5)}}$" is computed per the model above, where the double-differenced observations are derived from RTK measurements of signals received by the GNSS receiver and from RTK measurements sent from another GNSS receiver (e.g., one that belongs to the base station 120). The computation includes determining the integer ambiguity of the first wide lane phase (e.g., "$N_{WL-2-5}$"), as further described in connection with FIG. 5, and the integer ambiguity of the second wide lane phase (e.g., "$N_{WL-1-2}$") as further described in connection with FIGS. 6 and 7.

FIG. 5 is a flow diagram of a method of computing an integer ambiguity of a wide lane phase based on RTK $$\Phi_{IF,(WL-1-2,WL-1-5)} = \frac{f_1\,f_2}{f_1\,f_2 - f_1\,f_5}\Phi_{WL-1-2} - \frac{f_1\,f_5}{f_1\,f_2 - f_1\,f_5}\Phi_{WL-1-5},$$
$$= \rho + dT + ISTB_{IF,(WL-1-2,WL-1-5)} + Trop +$$
$$\frac{f_1\,f_2}{f_1\,f_2 - f_1\,f_5}\lambda_{WL-1-2}(N_{WL-1-2} + r_{WL-1-2} - s_{WL-1-2}) -$$
$$\frac{f_1\,f_5}{f_1\,f_2 - f_1\,f_5}\lambda_{WL-1-5}(N_{WL-1-5} + r_{WL-1-5} - s_{WL-1-5}) +$$
$$\epsilon_{\Phi_{IF,(WL-1-2,WL-1-5)}}$$

$$\Phi_{IF,(WL-1-2,WL-1-5)} = \frac{f_1\,f_2}{f_1\,f_2 - f_2\,f_5}\Phi_{WL-1-2} - \frac{f_2\,f_5}{f_1\,f_2 - f_1\,f_5}\Phi_{WL-2-5},$$
$$= \rho + dT + ISTB_{IF,(WL-1-2,WL-2-5)} + Trop +$$
$$\frac{f_1\,f_2}{f_1\,f_2 - f_2\,f_5}\lambda_{WL-1-2}(N_{WL-1-2} + r_{WL-1-2} - s_{WL-1-2}) -$$
$$\frac{f_2\,f_5}{f_1\,f_2 - f_2\,f_5}\lambda_{WL-2-5}(N_{WL-2-5} + r_{WL-2-5} - s_{WL-2-5}) +$$
$$\epsilon_{\Phi_{IF,(WL-1-2,WL-2-5)}}$$

$$\Phi_{IF,(WL-1-5,WL-2-5)} = \frac{f_1\,f_5}{f_1\,f_5 - f_2\,f_5}\Phi_{WL-1-2} - \frac{f_2\,f_5}{f_1\,f_5 - f_2\,f_5}\Phi_{WL-2-5}.$$
$$= \rho + dT + ISTB_{IF,(WL-1-5,WL-2-5)} + Trop +$$
$$\frac{f_1\,f_5}{f_1\,f_5 - f_2\,f_5}\lambda_{WL-1-5}(N_{WL-1-5} + r_{WL-1-5} - s_{WL-1-5}) -$$
$$\frac{f_2\,f_5}{f_1\,f_5 - f_2\,f_5}\lambda_{WL-2-5}(N_{WL-2-5} + r_{WL-2-5} - s_{WL-2-5}) +$$
$$\epsilon_{\Phi_{IF,(WL-1-5,WL-2-5)}}$$

measurements, according to an embodiment. Continuing with the above example of FIG. 4, the wide lane phase here is the first wide lane phase WL-2-5. However, the flow may be similarly applied to other wide lane phases depending on the particular combination of signals. In the used example, the wavelength of the combination of signals is very large (e.g., in the range of about three meters to about five meters depending on the constellation). Generally, the positioning accuracy is $\frac{1}{20}$ of the wavelength and the solution may still be vulnerable to, although it reduces, ionospheric errors. Thus, computing the integer ambiguity of the first wide lane only may not be sufficient for a decimeter or centimeter accuracy, in which case the integer ambiguity of the second wide lane phase can be determined to achieve the desired accuracy and further remove the ionospheric errors. Nonetheless, the computation of the integer ambiguity of the first wide lane phase need not involve complex algorithms, such as a Kalman filter(KF) or an IAR process and can be performed almost immediately and resulting accuracy can be further improved once the determination of the integer ambiguity of the second wide lane phase is completed.

At block 510, the GNSS receiver determines a narrow lane pseudo-range corresponding to the first combination of the first signal and the second signal (e.g., the combination of GNSS-L5 and GNSS-L2, as described in connection with FIG. 4). The narrow lane pseudo-range can be defined as:

$$P_{NL-2-5} = \frac{f_2}{f_2+f_5}P_{L2} - \frac{f_5}{f_2+f_5}P_{L5} =$$

$$\rho + dT + ISTB_{NL-2-5} + Trop + \frac{dIono}{f_2\,f_5} + \epsilon_{P_{NL-2-5}}.$$

Here also, double-difference observations can be used to compute the narrow lane pseudo-range, whereby this computation can be expressed as:

$$\nabla\Delta P_{NL-2-5} = \frac{f_2}{f_2+f_5}\nabla\Delta P_{L2} - \frac{f_5}{f_2+f_5}\nabla\Delta P_{L5} =$$

$$\nabla\Delta\rho + \nabla\Delta Trop + \frac{\nabla\Delta dIono}{f_2\,f_5} + \epsilon_{\nabla\Delta P_{NL-2-5}}.$$

At block 512, the GNSS receiver determines a phase measurement corresponding to the first combination. In an example, this phase measurement corresponds to the first wide lane phase and is computed, based on double-differenced observations, as:

$$\nabla\Delta\Phi_{WL-2-5} =$$

$$\nabla\Delta\rho + \nabla\Delta Trop + \frac{\nabla\Delta dIono}{f_2\,f_5} + \lambda_{WL-2-5}\nabla\Delta N_{WL-2-5} + \epsilon_{\nabla\Delta\Phi_{WL-2-5}}.$$

At block 514, the GNSS receiver determines a wavelength that corresponds to the first combination. As explained above, the wavelength depends on the specific signals and constellations thereof used in the definition of the combination. The applicable wavelengths can be stored in a memory of the GNSS receiver and indexed given the signals and the constellations. Accordingly, based on the specific combination, the GNSS receiver can retrieve the applicable wavelength form the memory. In an example, the first combination is for the GNSS-L5 and GNSS-L2, as described in connection with FIG. 4 and the applicable wavelengths are shown in Table 4 below.

TABLE 4

| GNSS Wide Lane (WL) | GPS | | GAL | | BDS | |
|---|---|---|---|---|---|---|
| | WL | λ (m) | WL | λ (m) | WL | λ (m) |
| GNSS-L2/ GNSS-L5 | L2/L5 | 5.8610 | E6/E5A | 2.9305 | B3/B2A | 3.2561 |

At block 516, the GNSS receiver computes the integer ambiguity of the first wide lane phase. This integer ambiguity is determined based on the wavelength, the new narrow lane pseudo-range, and the phase measurement. In an example, the integer ambiguity is computed, as a double-differenced observation, according to:

$$\nabla\Delta N_{WL-2-5} = \text{round}\left(\frac{\nabla\Delta\Phi_{WL-2-5} - \nabla\Delta P_{NL-2-5}}{\lambda_{WL-2-5}}\right).$$

The computed double-differenced observation is usable at block 416 of FIG. 4 to determine the ionosphere-free carrier phase.

FIG. 6 is a flow diagram of a method of using IAR process to determine an integer ambiguity of a wide lane phase based on RTK measurements, according to an embodiment. Continuing with the above example of FIG. 4, the wide lane phase here is the second wide lane phase WL-1-2. It is possible to compute a narrow lane pseudo-range and the second wide lane phase, respectively, as:

$$P_{NL-1-2} = \frac{f_1}{f_1+f_2}P_{L1} + \frac{f_2}{f_1+f_2}P_{L2} =$$

$$\rho + dT + ISTB_{NL-1-2} + Trop + \frac{dIono}{f_1\,f_2} + \epsilon_{P_{NL-1-2}},$$

$$\Phi_{WL-1-2} = \frac{f_1}{f_1-f_2}\Phi_{L1} - \frac{f_2}{f_1-f_2}\Phi_{L2} = \rho + dT + ISTB_{WL-1-2} +$$

$$Trop + \frac{dIono}{f_1\,f_2} + \lambda_{WL-1-2}(N_{WL-1-2} + r_{WL-1-2} - s_{WL-1-2}) + \epsilon_{\Phi_{WL-1-2}}.$$

However, rounding of the narrow lane pseudo-range and the second wide lane phase cannot be used to resolve the integer ambiguity of the second wide lane phase. Although the narrow lane pseudo-range can reduce code noise and multipath impact, the narrow lane pseudo-range errors are too large for the wavelength of the second combination of signals (e.g., the second wide lane WL-2-5). The wavelength is shown in Table 5 below.

TABLE 5

| GNSS Wide Lane (WL) | GPS | | GAL | | BDS | |
|---|---|---|---|---|---|---|
| | WL | λ (m) | WL | λ (m) | WL | λ (m) |
| GNSS-L1/ GNSS-L2 | L1/L2 | 0.8619 | E1/E6 | 1.0105 | B11/B3 | 1.0247 |

Instead of using the narrow lane pseudo-range, a new observation is defined and used. This new observation takes advantage of the triple frequency observations (e.g., observations for the three signals) and reduces noise, thereby allowing simple rounding method to fix the integer ambiguity of the second wide lane phase.

At block 610, the GNSS receiver determines a pseudo-range of the third signal (e.g., GNSS-L1 in the above example, corresponding to GPS L1, GAL E1, BDS B11, etc.) For example, the pseudo-range is computed as:

$$P_{L1} = \rho + dT + ISTB_{L1} + Trop + \frac{dIono}{f_1^2} + \epsilon_{P_{L1}}.$$

At block 612, the GNSS receiver determines a first phase measurement corresponding to the first combination. Continuing with the previous example, the first phase measurement is the first wide lane phase "$\Phi_{WL-2-5}$" and is computed as:

$$\Phi_{WL-2-5} = \rho + dT + ISTB_{WL-2-5} + Trop + \frac{dIono}{f_2 f_5} + \epsilon_{\Phi_{WL-2-5}}.$$

At block 614, the GNSS receiver determines an observation (e.g., the new observation) based on the pseudo-range and the first phase measurement. In an example, the observation is defined as:

$$Obs = a * P_{L1} + b * \Phi_{WL-2-5} = \rho + dT + Trop + \frac{dIono}{f_1 f_2} + \epsilon_{a*P_{L1}+b*\Phi_{WL-2-5}}.$$

In an example, "a" is set to 0.6356 and "b" is set to "0.3644." These values are derived by constraining the sum of "a" and "b" to be one and using the following equations:

$$a * \frac{dIono}{f_1^2} + b * \frac{dIono}{f_2 f_5} = \frac{dIono}{f_1 f_2},$$

$$(1-b) * \frac{1}{f_1^2} + b * \frac{1}{f_2 f_5} = \frac{1}{f_1 f_2},$$

$$b * \left(\frac{1}{f_2 f_5} - \frac{1}{f_1^2}\right) = \frac{1}{f_1 f_2} - \frac{1}{f_1^2},$$

$$b = \frac{\frac{1}{f_1 f_2} - \frac{1}{f_1^2}}{\frac{1}{f_2 f_5} - \frac{1}{f_1^2}}.$$

The "b" coefficient can be determined in other ways, as shown below. And the "a" coefficient can be derived from "b" given the constraint on the sum of these two coefficients.

$$b = \frac{\frac{1}{f_1 f_2} - \frac{1}{f_2^2}}{\frac{1}{f_2 f_5} - \frac{1}{f_2^2}},$$

$$b = \frac{\frac{1}{f_1 f_2} - \frac{1}{f_5^2}}{\frac{1}{f_2 f_5} - \frac{1}{f_5^2}}.$$

At block 616, the GNSS receiver determines a second phase measurement corresponding to the second combination. Continuing with the previous example, the second phase measurement is the second wide lane phase "$\Phi_{WL-1-2}$" and is computed as:

$$\Phi_{WL-1-2} = \frac{f_1}{f_1 - f_2}\Phi_{L1} - \frac{f_2}{f_1 - f_2}\Phi_{L2} = \rho + dT + ISTB_{WL-1-2} +$$

$$Trop + \frac{dIono}{f_1 f_2} + \lambda_{WL-1-2}(N_{WL-1-2} + r_{WL-1-2} - s_{WL-1-2}) + \epsilon_{\Phi_{WL-1-2}}.$$

At block 618, the GNSS receiver determines a wavelength that corresponds to the second combination. As explained above, the wavelength depends on the specific signals and constellations thereof used in the definition of the second combination. The applicable wavelengths can be stored in a memory of the GNSS receiver and indexed given the signals and the constellations. Accordingly, based on the specific combination, the GNSS receiver can retrieve the applicable wavelength form the memory. In an example, the second combination is for the GNSS-L1 and GNSS-L2, as described in connection with FIG. 4 and the applicable wavelengths are shown in Table 5 above.

At block 620, the GNSS receiver resolves the integer ambiguity of the second wide lane phase. This integer ambiguity is determined based on the wavelength, the new observation, and the second phase measurement. In an example, the integer ambiguity is determined, as a double-differenced observation, according to:

$$\nabla \Delta N_{WL-1-2} = \text{round}\left(\frac{\nabla \Delta \Phi_{WL-1-2} - \nabla \Delta Obs}{\lambda_{WL-1-2}}\right).$$

Because the wavelength is relatively smaller than the one used in FIG. 5, an IAR process can be used to resolve the integer ambiguity in FIG. 6 by searching through a space of possible integer ambiguities until convergence. The determined double-differenced observation is usable at block 416 of FIG. 4 to determine the ionosphere-free carrier phase.

The above flow diagram of FIG. 6 can be similarly applied to another combination of signals. For instance, rather than resolving the integer ambiguity of the second wide lane phase, a third wide lane phase can be defined and can correspond to the combination of the GNSS-L1 and GNSS-L5 signals. In this example, the above blocks can be repeated by using the proper signals. In particular, a narrow lane pseudo-range and a wide lane phase of the third combination (e.g., WL-1-5) can be defined, respectively, as:

$$P_{NL-1-5} = \frac{f_1}{f_1 + f_5} + P_{L1} - \frac{f_5}{f_1 + f_5}P_{L5},$$

$$\Phi_{WL-1-5} = \frac{f_1}{f_1 - f_5}\Phi_{L1} - \frac{f_5}{f_1 - f_5}\Phi_{L5}.$$

The wavelength for the third combination is shown in Table 2. And the "a" and "b" coefficients can be derived by observing the constraint on their sum and by using the following equations:

$$a * \frac{dIono}{f_1^2} + b * \frac{dIono}{f_2 f_5} = \frac{dIono}{f_1 f_5},$$

$$(1-b) * \frac{1}{f_1^2} + b * \frac{1}{f_2 f_5} = \frac{1}{f_1 f_5},$$

$$b * \left(\frac{1}{f_2 f_5} - \frac{1}{f_1^2}\right) = \frac{1}{f_1 f_5} - \frac{1}{f_1^2},$$

-continued $$b = \frac{\frac{1}{f_1 \, f_5} - \frac{1}{f_1^2}}{\frac{1}{f_2 \, f_5} - \frac{1}{f_1^2}}.$$

The "b" coefficient can alternatively be expressed as:

$$b = \frac{\frac{1}{f_1 \, f_5} - \frac{1}{f_2^2}}{\frac{1}{f_2 \, f_5} - \frac{1}{f_2^2}}.$$

Or, the "b" coefficient can alternatively be expressed as:

$$b = \frac{\frac{1}{f_1 \, f_5} - \frac{1}{f_5^2}}{\frac{1}{f_2 \, f_5} - \frac{1}{f_5^2}}.$$

FIG. 7 is a flow diagram of another method of determining an integer ambiguity of a wide lane phased base on RTK measurements. The flow diagram here can be used in lieu of or in conjunction with the flow diagram of FIG. 6. In lieu use, the resolution of the integer ambiguity of the second wide lane phase is relatively faster than the flow diagram of FIG. 6, but is less reliable (and hence, the location of the rover station can be determined in fast manner, but may not be as accurate as targeted). An in conjunction use speeds up the resolution of the integer ambiguity, while also achieving the high accuracy positioning that the flow diagram of FIG. 6 provides. In both cases, the flow diagram of FIG. 7 increases the wavelength of the second combination (e.g., "$\lambda_{WL-1-2}$"), such that the convergence is fast.

At block 710, the GNSS receiver forms an ionosphere-free carrier phase based on the first wide lane phase and the second wide lane phase. In an example, double-differenced observations can be used, and the ionosphere-free carrier phase can be expressed as a function of double-differenced observations, similarly to block 414 of FIG. 4.

At block 712, the GNSS receiver determines the integer ambiguity of the first wide lane phase. This operation is similar to the determination of block 516 of FIG. 5.

At block 714, the GNSS receiver sets a wavelength for the second combination, where this wavelength is much longer than the one used in the flow diagram of FIG. 6, such as in the order of about three to about four times longer. In an example, this wavelength is defined depending on the signals per Table 6 below.

TABLE 6

| Wavelength λ to use (in meter) | GPS | GAL | BDS |
|---|---|---|---|
| GNSS-L1/GNSS-L2 wide lane ambiguity | 3.40 | 3.99 | 4.15 |

At block 716, the GNSS receiver determines the integer ambiguity of the second wide lane phase. This operation is similar to the determination of block 620 of FIG. 6, except that the determination uses a much longer wavelength (between about three to about four times longer) and, thus, the convergence is faster.

Figure 8:
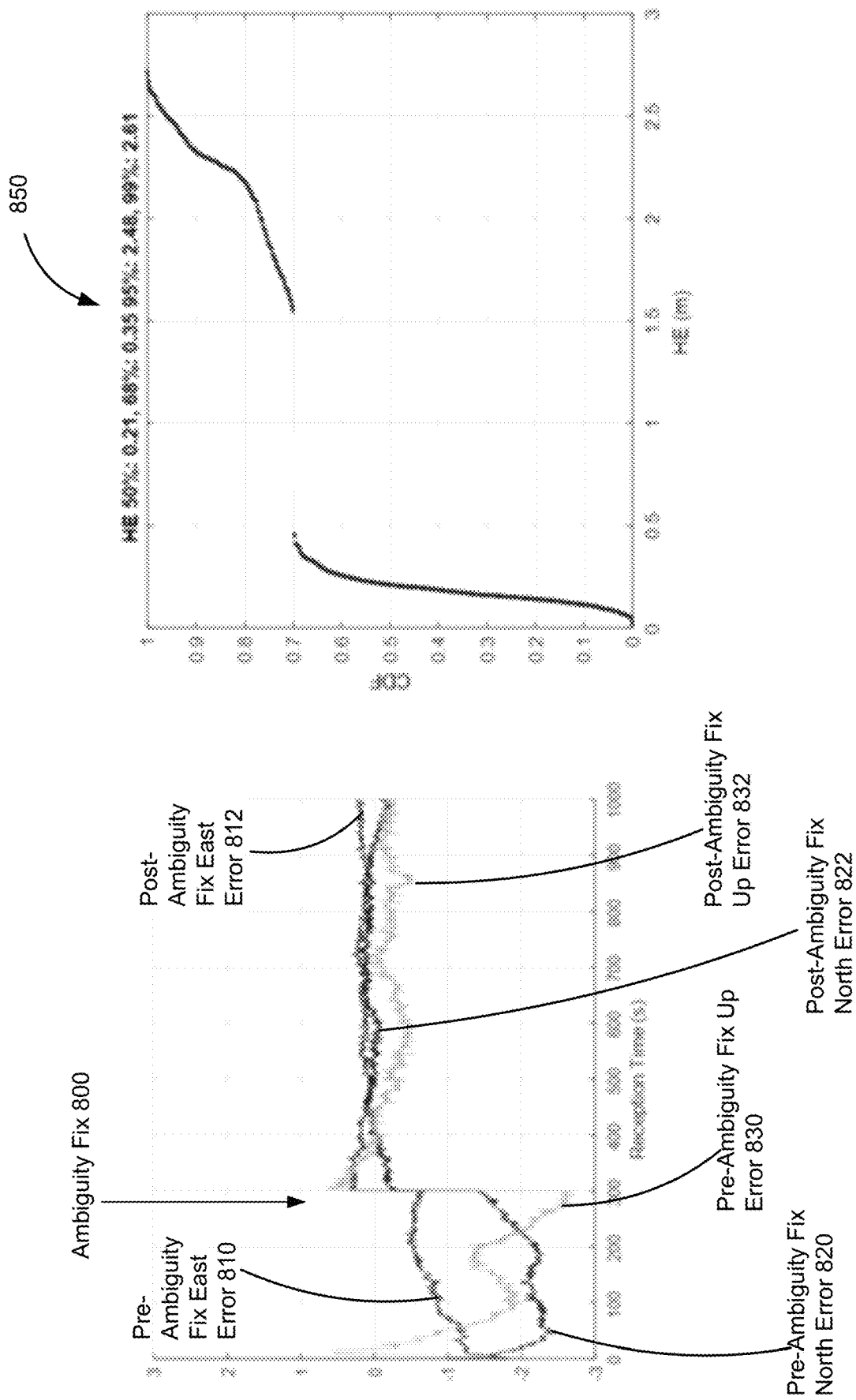
FIG. 8 is a graph illustrating position error results, according to an embodiment.

FIG. 8 is a graph illustrating position error results (in meters) over time (in seconds) in the East-North-Up (ENU) coordinate system. In particular, north (latitudinal) error 810, east (longitudinal) error 820, and up (vertical) error 830 are plotted prior to ambiguity fix 800 (e.g., the determination of the integer ambiguity per flow diagrams of FIGS. 5-6). The north (latitudinal) error 812, east (longitudinal) error 822, and up (vertical) error 832 are also plotted after ambiguity fix 800. As shown, total horizontal error (east error 820 and north error 810) was reduced to and remained under 20 cm after roughly three-hundred second.

FIG. 9 is a graph illustrating integer ambiguity results, according to an embodiment. The left plot 900 shows the range (on the vertical axis) of integer ambiguities (on the horizontal axis) when none of the flow diagram of FIGS. 6-7 are used. The right plot 950 shows the range (on the vertical axis) of integer ambiguities over time (on the horizontal axis) when the flow diagram of FIG. 6 is used. As can be seen, the average in both plots is ten. However, the variation is much larger in the plot 900, thereby indicating that the convergence for resolving the integer ambiguity per the flow diagram of FIG. 6 is much faster.

FIG. 10 is a flow diagram of a method of determining a location of a GNSS receiver based on an ionosphere-free carrier phase, according to an embodiment. Alternative embodiments may vary in function by combining, separating, or otherwise varying the functionality described in the blocks illustrated in FIG. 10. In an example, the GNSS receiver also includes a transceiver. b The functionality of one or more blocks illustrated in FIG. 10 may be performed by a computing device, such as the rover station 110 or another computing device communicatively coupled with the rover station 110 directly or indirectly via a data network (e.g., the base station 120, or an intermediate device communicatively coupled with the rover station 110 and the base station 120), as indicated in the previously-described embodiments. As such, means for performing the functionality of one or more of the blocks illustrated in FIG. 10 may comprise hardware and/or software components illustrated in FIGS. 11 and/or 12, which respectively illustrate components of the rover station 110 and the other computing device), and which are discussed in more detail below.

At block 1010, a plurality of signals are received from at least one satellite for example via the GNSS receiver. The plurality of signals comprises a first signal, a second signal, and a third signal, each one of the plurality of signals having a different wavelength. For example, the first signal is a GNSS-L5 signal, the second signal is a GNSS-L2 signal, and the third signal is GNSS-L1 signal, as described herein above.

Means for performing the functionality at block 1010 may include one or more software and/or hardware components of a rover station 110, such as a bus 1105, processing unit(s) 1110, memory 1160, wireless communication interface 1130, GNSS receiver 1180, and/or other software and/or hardware components of the rover station 110 illustrated in FIG. 11 and described in more detail below.

Additionally or alternatively, means for performing the functionality at block 1010 may include one or more software and/or hardware components of the other computing device, such as a bus 1205, processing unit(s) 1210, working memory 1235, communications subsystem 1230, and/or other software and/or hardware components of the computer system 1200 illustrated in FIG. 12 which is described in more detail below.

At block 1012, first RTK measurement information is determined based on the plurality of signals. The first RTK measurement information can be determined, at least in part, by a GNSS receiver of the rover station 110 from carrier waves of the GNSS-L5 signal, GNSS-L2 signal, and GNSS-L1 signal.

Means for performing the functionality at block 1012 may include one or more software and/or hardware components of a rover station 110, such as a bus 1105, processing unit(s) 1110, memory 1160, wireless communication interface 1130, GNSS receiver 1180, and/or other software and/or hardware components of the rover station 110 illustrated in FIG. 11 and described in more detail below.

Additionally or alternatively, means for performing the functionality at block 1010 may include one or more software and/or hardware components of the other computing device, such as a bus 1205, processing unit(s) 1210, working memory 1235, communications subsystem 1230, and/or other software and/or hardware components of the computer system 1200 illustrated in FIG. 12 which is described in more detail below.

At block 1014, second RTK measurement information is received from a base station (e.g., the base station 120) for example via the GNSS receiver. The second RTK measurement information can be determined, at least in part, by a GNSS receiver of the base station also from carrier waves of the GNSS-L5 signal, GNSS-L2 signal, and GNSS-L1 signal and can be sent to the rover station 110 over a data network. By using the first RTK measurement information and the second RTK measurement information, at least one of a first carrier phase, a second carrier phase, or an ionosphere-free carrier phase is determined as a double-differenced observation of (i) first measurements from the first RTK measurement information and (ii) second measurements from the second RTK measurement information.

Means for performing the functionality at block 1014 may include one or more software and/or hardware components of a rover station 110, such as a bus 1105, processing unit(s) 1110, memory 1160, wireless communication interface 1130, GNSS receiver 1180, and/or other software and/or hardware components of the rover station 110 illustrated in FIG. 11 and described in more detail below.

Additionally or alternatively, means for performing the functionality at block 1014 may include one or more software and/or hardware components of the other computing device, such as a bus 1205, processing unit(s) 1210, working memory 1235, communications subsystem 1230, and/or other software and/or hardware components of the computer system 1200 illustrated in FIG. 12 which is described in more detail below.

At block 1016, the first carrier phase for a first combination of the first signal and the second signal is determined. The first combination has a wavelength that is longer than a first wavelength of the first signal and a second wavelength of the second signal. For example, the wavelength of the first combination is within a range of two and six meters and the first carrier phase is a first wide lane phase for the first combination, and the wavelength of the second combination is within a range of a half meter to two meters and the second carrier phase is a second wide lane phase for the second combination. In an illustration, the first carrier phase is the first wide lane phase for the first combination of the GNSS-L5 signal and the GNSS-L2 signal and its wavelength is in a range of two and six meters depending on a constellation of the at least one satellite, as described herein above.

Determining the first carrier phase can include block 1017, where a first integer ambiguity of the first carrier phase is computed based on a pseudo-range measurement, a phase measurement, and the wavelength corresponding to the first combination. The computation can involve the blocks of the flow diagram of FIG. 5.

Means for performing the functionality at blocks 1016 and 1017 may include one or more software and/or hardware components of a rover station 110, such as a bus 1105, processing unit(s) 1110, memory 1160, wireless communication interface 1130, GNSS receiver 1180, and/or other software and/or hardware components of the rover station 110 illustrated in FIG. 11 and described in more detail below.

Additionally or alternatively, means for performing the functionality at blocks 1016 and 1017 may include one or more software and/or hardware components of the other computing device, such as a bus 1205, processing unit(s) 1210, working memory 1235, communications subsystem 1230, and/or other software and/or hardware components of the computer system 1200 illustrated in FIG. 12 which is described in more detail below.

At block 1018, the second carrier phase for a second combination of the first signal and the second signal is determined. The second combination has a wavelength that is longer than the second wavelength of the second signal and a third wavelength of the third signal. For example, the second carrier phase is the second wide lane phase of for the second combination of the GNSS-L2 signal and the GNSS-L1 signal and its wavelength is in a range of a half meter to two meters depending on a constellation of the at least one satellite, as described herein above. Determining the second carrier phase can include block 1019, where a second integer ambiguity of the second carrier phase is resolved by applying an IAR process that uses a pseudo-range measurement corresponding to the third signal and a phase measurement corresponding to the first combination. The IAR process further uses a phase measurement and the wavelength corresponding to the second combination. This resolution can involve the blocks of the flow diagram of FIG. 6. The resolution can additionally or alternatively involve the blocks of the flow diagram of FIG. 7, in which case a function to determine the ionosphere-free carrier phase further uses a different wavelength for the second combination, where the different wavelength is longer than the wavelength used by the IAR process for the second combination.

Means for performing the functionality at blocks 1018 and 1019 may include one or more software and/or hardware components of a rover station 110, such as a bus 1105, processing unit(s) 1110, memory 1160, wireless communication interface 1130, GNSS receiver 1180, and/or other software and/or hardware components of the rover station 110 illustrated in FIG. 11 and described in more detail below.

Additionally or alternatively, means for performing the functionality at blocks 1018 and 1019 may include one or more software and/or hardware components of the other computing device, such as a bus 1205, processing unit(s) 1210, working memory 1235, communications subsystem 1230, and/or other software and/or hardware components of the computer system 1200 illustrated in FIG. 12 which is described in more detail below.

At block 1020, an ionosphere-free carrier phase is determined based on the first carrier phase and the second carrier phase. In an example, the ionosphere-free carrier phase is determined as a function of a first integer ambiguity of the first carrier phase and a second integer ambiguity of the second carrier phase. In this example, determining the ionosphere-free carrier phase can involve the blocks of the flow diagram of FIG. 4. In this and the above blocks, each of the ionosphere-free carrier phase, the first integer ambiguity, and the second integer ambiguity can be determined based on double-differenced observation generated from the first RTK measurement information of the rover station 110 and the second RTK measurement information of the base station.

Means for performing the functionality at block 1020 may include one or more software and/or hardware components of a rover station 110, such as a bus 1105, processing unit(s) 1110, memory 1160, wireless communication interface 1130, GNSS receiver 1180, and/or other software and/or hardware components of the rover station 110 illustrated in FIG. 11 and described in more detail below.

Additionally or alternatively, means for performing the functionality at block 1020 may include one or more software and/or hardware components of the other computing device, such as a bus 1205, processing unit(s) 1210, working memory 1235, communications subsystem 1230, and/or other software and/or hardware components of the computer system 1200 illustrated in FIG. 12 which is described in more detail below.

At block 1022, a location of the rover station based on the ionosphere-free carrier phase. In an example, the ionosphere-free carrier phase is usable to determine, at a high accuracy, the number of carrier cycles between the GNSS receiver of the rover station 110 and the at least one satellite. The location is a function of the number of carrier cycles. If the location is determined by the base station and the intermediate device, rather than the rover station 110, the location can be sent therefrom to the rover station 110.

Means for performing the functionality at block 1022 may include one or more software and/or hardware components of a rover station 110, such as a bus 1105, processing unit(s) 1110, memory 1160, wireless communication interface 1130, GNSS receiver 1180, and/or other software and/or hardware components of the rover station 110 illustrated in FIG. 11 and described in more detail below.

Additionally or alternatively, means for performing the functionality at block 1022 may include one or more software and/or hardware components of the other computing device, such as a bus 1205, processing unit(s) 1210, working memory 1235, communications subsystem 1230, and/or other software and/or hardware components of the computer system 1200 illustrated in FIG. 12 which is described in more detail below.

Figure 11:
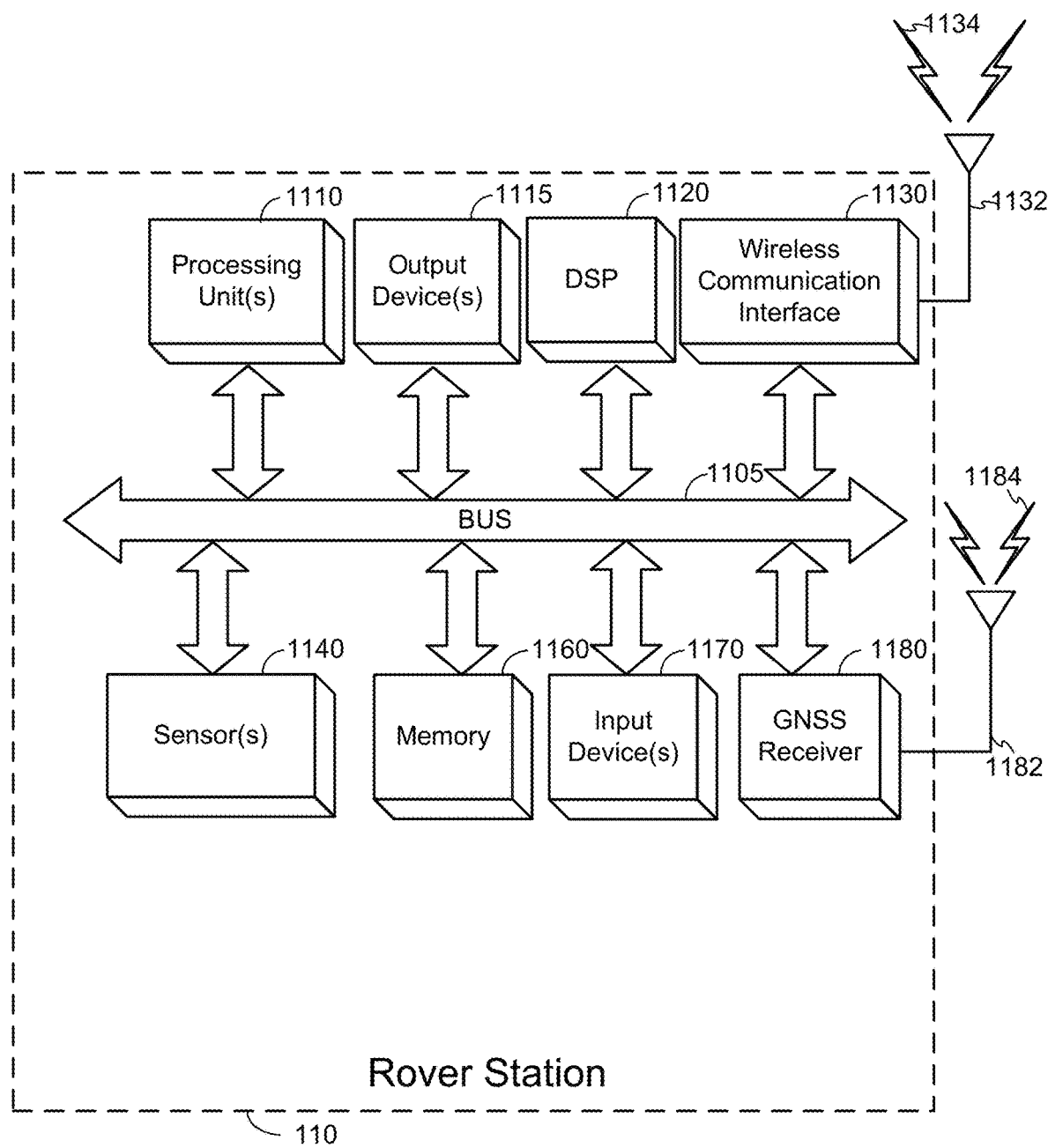
FIG. 11 is a block diagram of a rover station, according to an embodiment.

FIG. 11 is a block diagram of various hardware and software components of a rover station 110, according to an embodiment. These components can be utilized as described herein above (e.g., in association with FIGS. 1-9). For example, the rover station 110 can perform the actions of the rover station 110 illustrated in FIGS. 4 and 8, and/or one or more of the functions of the method 900 illustrated in FIG. 9. It should be noted that FIG. 11 is meant only to provide a generalized illustration of various components, any or all of which may be utilized as appropriate. As previously noted, rover stations 110 may vary in form and function, and may ultimately comprise any GNSS-enabled device, including vehicles, commercial and consumer electronic devices, survey equipment, and more. Thus, in some instances, components illustrated by FIG. 11 can be localized to a single physical device and/or distributed among various networked devices, which may be disposed at different physical locations (e.g., different locations of a vehicle).

The rover station 110 is shown comprising hardware elements that can be electrically coupled via a bus 1105 (or may otherwise be in communication, as appropriate). The hardware elements may include a processing unit(s) 1110 which can include, without limitation, one or more general-purpose processors, one or more special-purpose processors (such as digital signal processing (DSP) chips, graphics acceleration units (GPUs), application specific integrated circuits (ASICs), and/or the like), and/or other processing structure or means. As shown in FIG. 11, some embodiments may have a separate Digital Signal Processor (DSP) 1120, depending on desired functionality. Location determination and/or other determinations based on wireless communication may be provided in the processing unit(s) 1110 and/or wireless communication interface 1130 (discussed below). The rover station 110 also can include one or more input devices 1170, which can include, without limitation, a keyboard, touch screen, a touch pad, microphone, button(s), dial(s), switch(es), and/or the like; and one or more output devices 1115, which can include, without limitation, a display, light emitting diode (LED), speakers, and/or the like. As will be appreciated, the type of input devices 1170 and output devices 1115 may depend on the type of rover station 110 with which the input devices 1170 and output devices 1115 are integrated.

The rover station 110 may also include a wireless communication interface 1130, which may comprise, without limitation, a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, a WAN device and/or various cellular devices, etc.), and/or the like, which may enable the rover station 110 to communicate via the networks described above with regard to FIG. 1. The wireless communication interface 1130 may permit data and signaling to be communicated (e.g., transmitted and received) with a network, for example, via WAN access points, cellular base stations and/or other access node types, and/or other network components, computer systems, and/or any other electronic devices described herein. The communication can be carried out via one or more wireless communication antenna(s) 1132 that send and/or receive wireless signals 1134.

Depending on desired functionality, the wireless communication interface 1130 may comprise separate transceivers to communicate with base stations and other terrestrial transceivers, such as wireless devices and access points. The rover station 110 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX™ (IEEE 802.16) network, and so on. A CDMA network may implement one or more radio access technologies (RATs) such as CDMA2000®, Wideband CDMA (WCDMA), and so on. CDMA2000 includes IS-95, IS-2000, and/or IS-856 standards. A TDMA network may implement GSM, Digital Advanced Mobile Phone System (D-AMPS), or some other RAT. An OFDMA network may employ LTE™, LTE™ Advanced, 5G NR, and so on. 5G NR, Long-Term Evolution (LTE™), LTE Advanced, GSM, and WCDMA are described in documents from the Third Generation Partnership Project (3GPP™). CDMA2000® is described in documents from a consortium named "3rd Generation Partnership Project 2" (3GPP2). 3GPP™ and 3GPP2 documents are publicly available. A wireless local area network (WLAN) may also be an IEEE 802.11x network, and a wireless personal area network (WPAN) may be a Bluetooth® network, an IEEE 802.15x, or some other type of network. The techniques described herein may also be used for any combination of WWAN, WLAN and/or WPAN.

The rover station 110 can further include sensor(s) 1140. Sensors 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein, in some instances.

Embodiments of the rover station 110 may also include a GNSS receiver 1180 capable of receiving signals 1184 from one or more GNSS satellites (e.g., SVs 140) as described herein using an antenna 1182 (which could be the same as antenna 1132). The GNSS receiver 1180 can extract a position of the rover station 110, using conventional techniques, from GNSS SVs of a GNSS system (e.g., SVs 140 of FIG. 1), such as GPS, GAL, GLONASS, Quasi-Zenith Satellite System (QZSS) over Japan, Indian Regional Navigational Satellite System (IRNSS) over India, Beidou over China, and/or the like. Moreover, the GNSS receiver 1180 can be used with various augmentation systems (e.g., SBAS) that may be associated with or otherwise enabled for use with one or more global and/or regional navigation satellite systems, such as, WAAS, European Geostationary Navigation Overlay Service (EGNOS), Multi-functional Satellite Augmentation System (MSAS), and Geo Augmented Navigation system (GAGAN), and/or the like. The GNSS receiver 1180 can also include a transceiver.

The rover station 110 may further include and/or be in communication with a memory 1160. The memory 1160 may comprise a machine- or computer-readable medium, which can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including, without limitation, various file systems, database structures, and/or the like.

The memory 1160 of the rover station 110 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the rover station 110 (and/or processing unit(s) 1110 or DSP 1120 within rover station 110). In an aspect, then, such code and/or instructions can be used to configure and/or adapt a general purpose computer (or other device) to perform one or more operations in accordance with the described methods.

Figure 12:
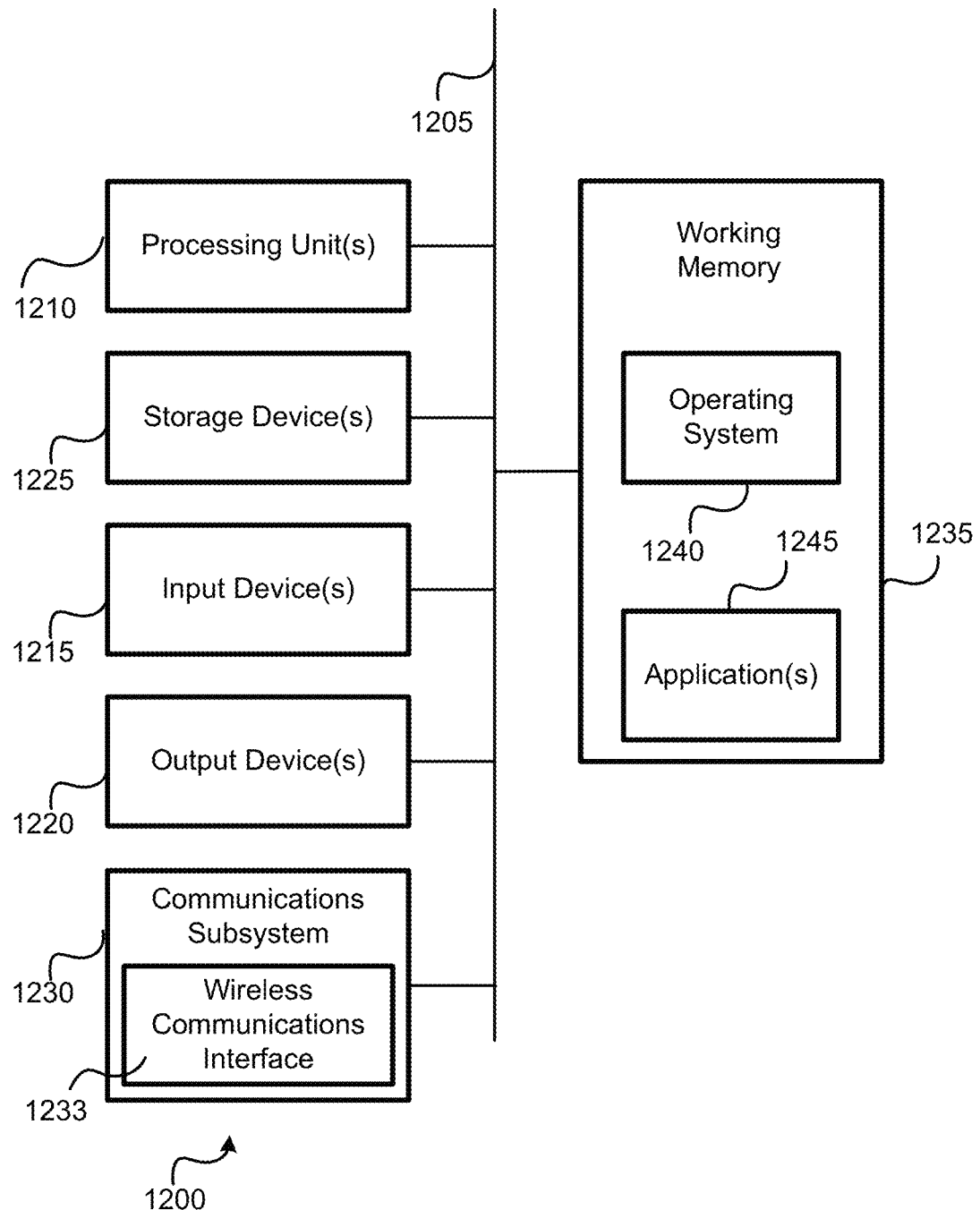
FIG. 12 is a block diagram of an embodiment of a computer system, according to an embodiment.

FIG. 12 illustrates an embodiment of a computer system 1200, which may be utilized and/or incorporated into a base station 120 and/or other devices described herein. FIG. 12 provides a schematic illustration of one embodiment of a computer system 1200 that can perform the methods provided by various other embodiments, such as the methods described in relation to FIGS. 1-9. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, as with the components of FIG. 11, components illustrated by FIG. 12 can be localized to a single device and/or distributed among various networked devices, which may be disposed at different physical or geographical locations.

The computer system 1200 is shown comprising hardware elements that can be electrically coupled via a bus 1205 (or may otherwise be in communication, as appropriate). The hardware elements may include processing unit(s) 1210, which can include, without limitation, one or more general-purpose processors, one or more special-purpose processors (such as DSPs, ASICs, GPUs, and/or the like), and/or other processing structure, which can be configured to perform one or more of the methods described herein, including the method described in relation to FIG. 9. The computer system 1200 also can include one or more input devices 1215, which can include, without limitation, a mouse, a keyboard, a camera, a microphone, and/or the like; and one or more output devices 1220, which can include, without limitation, a display device, a printer, and/or the like. Again, the type of input devices 1215 and output devices 1220 may depend on the type computer system 1200.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device, such as a RAM, and/or ROM, which can be programmable, flash-updateable, and/or the like. Such storage devices may be configured to implement any appropriate data stores, including, without limitation, various file systems, database structures, and/or the like.

The computer system 1200 may also include a communications subsystem 1230, which can include, in addition to a GNSS receiver, support of wireline communication technologies and/or wireless communication technologies (in some embodiments) managed and controlled by a wireless communication interface 1233. The communications subsystem 1230 may include a modem, a network card (wireless or wired), an infrared communication device, a wireless communication device, and/or a chipset, and/or the like. The communications subsystem 1230 may include one or more input and/or output communication interfaces, such as the wireless communication interface 1233, to permit data and signaling to be exchanged with a network, mobile devices, other computer systems, and/or any other electronic devices described herein.

In many embodiments, the computer system 1200 will further comprise a working memory 1235, which can include a RAM and/or or ROM device. Software elements, shown as being located within the working memory 1235, can include an operating system 1240, device drivers, executable libraries, and/or other code, such as application(s) 1245, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 9, may be implemented as code and/or instructions that are stored (e.g., temporarily) in working memory 1235 and are executable by a computer (and/or a processing unit within a computer such as processing unit(s) 1210); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device or system is capable of manipulating or transforming signals, typically represented as physical electronic, electrical, or magnetic quantities within memories, registers, or other information storage devices, transmission devices, or display devices of the special purpose computer or similar special purpose electronic computing device or system.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of Global Navigation Satellite System (GNSS) positioning of a rover station, the method comprising:
   receiving, from at least one satellite, a plurality of signals comprising a first signal, a second signal, and a third signal, each one of the plurality of signals having a different wavelength;
   determining a first carrier phase for a first combination of the first signal and the second signal, the first combination having a wavelength that is longer than a first wavelength of the first signal and a second wavelength of the second signal;
   determining a second carrier phase for a second combination of the second signal and the third signal, the second combination having a wavelength that is longer than the second wavelength of the second signal and a third wavelength of the third signal;
   determining, based on the plurality of signals, first Real-Time Kinematic (RTK) measurement information of the rover station;

receiving, from a base station, second RTK measurement information of the base station;

determining an ionosphere-free carrier phase based on the first carrier phase and the second carrier phase, wherein at least one of the first carrier phase, the second carrier phase, or the ionosphere-free carrier phase is determined as a double-differenced observation generated from the first RTK measurement information of the rover station and the second RTK measurement information of the base station; and determining a location of the rover station based on the ionosphere-free carrier phase.

2. The method of claim 1, wherein the wavelength of the first combination is within a range of two and six meters and the first carrier phase is a first wide lane phase for the first combination, and wherein the wavelength of the second combination is within a range of a half meter to two meters and the second carrier phase is a second wide lane phase for the second combination.

3. The method of claim 1, wherein the ionosphere-free carrier phase is determined as a function of a first integer ambiguity of the first carrier phase and a second integer ambiguity of the second carrier phase.

4. The method of claim 3, further comprising:
computing the first integer ambiguity based on a pseudo-range measurement, a phase measurement, and the wavelength corresponding to the first combination.

5. The method of claim 3, further comprising:
resolving the second integer ambiguity by applying an integer ambiguity resolution (IAR) process that uses a pseudo-range measurement corresponding to the third signal and a phase measurement corresponding to the first combination.

6. The method of claim 5, wherein the IAR process further uses a phase measurement and the wavelength corresponding to the second combination.

7. The method of claim 6, wherein the function to determine the ionosphere-free carrier phase further uses a different wavelength for the second combination, wherein the different wavelength is longer than the wavelength used by the IAR process for the second combination.

8. The method of claim 3, wherein each of the ionosphere-free carrier phase, the first integer ambiguity, and the second integer ambiguity is determined based on the double-differenced observation generated from the first RTK measurement information of the rover station and the second RTK measurement information of a base station.

9. A device for Global Navigation Satellite System (GNSS) positioning of a rover station, the device comprising:
a receiver;
a memory; and
one or more processing units communicatively coupled with the memory and configured to:
receive, from at least one satellite via the receiver, a plurality of signals comprising a first signal, a second signal, and a third signal, each one of the plurality of signals having a different wavelength;
determine a first carrier phase for a first combination of the first signal and the second signal, the first combination having a wavelength that is longer than a first wavelength of the first signal and a second wavelength of the second signal;
determine a second carrier phase for a second combination of the second signal and the third signal, the second combination having a wavelength that is longer than the second wavelength of the second signal and a third wavelength of the third signal;

determine, based on the plurality of signals, first Real-Time Kinematic (RTK) measurement information;

receive, from a base station, second RTK measurement information of the base station;

determine an ionosphere-free carrier phase based on the first carrier phase and the second carrier phase, wherein at least one of the first carrier phase, the second carrier phase, or the ionosphere-free carrier phase is determined as a double-differenced observation generated from the first RTK measurement information of the rover station and the second RTK measurement information of the base station; and determine a location of the rover station based on the ionosphere-free carrier phase.

10. The device of claim 9, wherein the first carrier phase is a first wide lane phase for the first combination having the wavelength in a range of two and six meters depending on a constellation of the at least one satellite, and wherein the second carrier phase is a second wide lane phase for the second combination having the wavelength in a range of a half meter to two meters depending on the constellation.

11. The device of claim 9, wherein the ionosphere-free carrier phase is determined as a function of a first integer ambiguity of the first carrier phase and a second integer ambiguity of the second carrier phase.

12. The device of claim 11, wherein the one or more processing units are further configured to:
compute the first integer ambiguity based on a pseudo-range measurement, a phase measurement, and the wavelength corresponding to the first combination.

13. The device of claim 11, wherein the one or more processing units are further configured to:
resolve the second integer ambiguity by applying an integer ambiguity resolution (IAR) process that uses a pseudo-range measurement corresponding to the third signal and a phase measurement corresponding to the first combination.

14. The device of claim 13, wherein the IAR process further uses a phase measurement and the wavelength corresponding to the second combination.

15. The device of claim 14, wherein the function to determine the ionosphere-free carrier phase further uses a different wavelength for the second combination, wherein the different wavelength is longer than the wavelength used by the IAR process for the second combination.

16. The device of claim 11, wherein each of the ionosphere-free carrier phase, the first integer ambiguity, and the second integer ambiguity is determined based on the double-differenced observation generated from the first RTK measurement information of the rover station and the second RTK measurement information of a base station.

17. A device for Global Navigation Satellite System (GNSS) positioning of a rover station, the device comprising:
means for receiving, from at least one satellite, a plurality of signals comprising a first signal, a second signal, and a third signal, each one of the plurality of signals having a different wavelength;
means for determining a first carrier phase for a first combination of the first signal and the second signal, the first combination having a wavelength that is longer than a first wavelength of the first signal and a second wavelength of the second signal;
means for determining a second carrier phase for a second combination of the second signal and the third signal, the second combination having a wavelength that is longer than the second wavelength of the second signal and a third wavelength of the third signal;

means for determining, based on the plurality of signals, first Real-Time Kinematic (RTK) measurement information the rover station;

means for receiving, from a base station, second RTK measurement information of the base station;

means for determining an ionosphere-free carrier phase based on the first carrier phase and the second carrier phase, wherein at least one of the first carrier phase, the second carrier phase, or the ionosphere-free carrier phase is determined as a double-differenced observation generated from the first RTK measurement information of the rover station and the second RTK measurement information of the base station; and means for determining a location of the rover station based on the ionosphere-free carrier phase.

18. The device of claim 17, wherein the first carrier phase is a first wide lane phase for the first combination having the wavelength in a range of two and six meters depending on a constellation of the at least one satellite, and wherein the second carrier phase is a second wide lane phase for the second combination having the wavelength in a range of a half meter to two meters depending on the constellation.

19. The device of claim 17, wherein the ionosphere-free carrier phase is determined as a function of a first integer ambiguity of the first carrier phase and a second integer ambiguity of the second carrier phase.

20. The device of claim 19, further comprising:
means for computing the first integer ambiguity based on a pseudo-range measurement, a phase measurement, and the wavelength corresponding to the first combination.

21. The device of claim 19, further comprising:
means for resolving the second integer ambiguity by applying an integer ambiguity resolution (IAR) process that uses a pseudo-range measurement corresponding to the third signal and a phase measurement corresponding to the first combination.

22. The device of claim 21, wherein the TAR process further uses a phase measurement and the wavelength corresponding to the second combination.

23. The device of claim 22, wherein the function to determine the ionosphere-free carrier phase further uses a different wavelength for the second combination, wherein the different wavelength is longer than the wavelength used by the TAR process for the second combination.

24. The device of claim 19, wherein each of the ionosphere-free carrier phase, the first integer ambiguity, and the second integer ambiguity is determined based on the double-differenced observation generated from the first RTK measurement information of the rover station and the second RTK measurement information of a base station.

25. A non-transitory computer-readable medium having instructions stored there with Global Navigation Satellite System (GNSS) positioning of a rover station, wherein the instructions, when executed by one or more processing units, cause the one or more processing units to:

receive, from at least one satellite, a plurality of signals comprising a first signal, a second signal, and a third signal, each one of the plurality of signals having a different wavelength;

determine a first carrier phase for a first combination of the first signal and the second signal, the first combination having a wavelength that is longer than a first wavelength of the first signal and a second wavelength of the second signal;

determine a second carrier phase for a second combination of the second signal and the third signal, the second combination having a wavelength that is longer than the second wavelength of the second signal and a third wavelength of the third signal;

determine, based on the plurality of signals, first Real-Time Kinematic (RTK) measurement information of the rover station;

receive, from a base station, second RTK measurement information the base station;

determine an ionosphere-free carrier phase based on the first carrier phase and the second carrier phase, wherein at least one of the first carrier phase, the second carrier phase, or the ionosphere-free carrier phase is determined as a double-differenced observation generated from the first RTK measurement information of the rover station and the second RTK measurement information of the base station; and determine a location of the rover station based on the ionosphere-free carrier phase.

26. The non-transitory computer-readable medium of claim 25, wherein the ionosphere-free carrier phase is determined as a function of a first integer ambiguity of the first carrier phase and a second integer ambiguity of the second carrier phase.

* * * * *